US012368248B2

(12) United States Patent
Chin et al.

(10) Patent No.: US 12,368,248 B2
(45) Date of Patent: Jul. 22, 2025

(54) PHASED ARRAY ANTENNA

(71) Applicant: Agency for Science, Technology and Research, Singapore (SG)

(72) Inventors: Po Shin Francois Chin, Singapore (SG); Nasimuddin, Singapore (SG); Bo Shi, Singapore (SG); Xianming Qing, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 142 days.

(21) Appl. No.: 18/284,051

(22) PCT Filed: Mar. 29, 2022

(86) PCT No.: PCT/SG2022/050176
§ 371 (c)(1),
(2) Date: Sep. 25, 2023

(87) PCT Pub. No.: WO2022/211734
PCT Pub. Date: Oct. 6, 2022

(65) Prior Publication Data
US 2024/0305018 A1 Sep. 12, 2024

(30) Foreign Application Priority Data
Mar. 31, 2021 (SG) ........................... 10202103335X

(51) Int. Cl.
*H01Q 21/00* (2006.01)
*H01Q 3/36* (2006.01)
*H01Q 5/42* (2015.01)
*H01Q 21/06* (2006.01)
*H01Q 23/00* (2006.01)

(52) U.S. Cl.
CPC ............... *H01Q 23/00* (2013.01); *H01Q 3/36* (2013.01); *H01Q 5/42* (2015.01); *H01Q 21/065* (2013.01)

(58) Field of Classification Search
CPC ...... H01Q 21/00; H01Q 21/06; H01Q 21/065; H01Q 21/29; H01Q 23/00; H01Q 3/24; H01Q 3/34; H01Q 3/36; H01Q 5/42
See application file for complete search history.

(56) References Cited

U.S. PATENT DOCUMENTS 4,797,682 A * 1/1989 Klimczak .............. H01Q 21/22 343/777
6,456,244 B1 * 9/2002 Goldstein .......... H01Q 21/0087 343/700 MS (Continued)

FOREIGN PATENT DOCUMENTS

CN 103985970 A 8/2014

OTHER PUBLICATIONS

El-Sawaf et al., "A K/Ka Shared-Aperture DRA Array with High Isolation," IEEE International Symposium on Antennas and Propagation and USNC-URSI Radio Science Meeting, Jul. 12, 2019, pp. 891-892.

(Continued)

*Primary Examiner* — Tho G Phan
(74) *Attorney, Agent, or Firm* — Shackelford, Mckinley & Norton, LLP

(57) ABSTRACT

A phased array antenna that maximizes antenna gain and minimizes or avoids grating/side lobes issues. The phased array antenna includes a receiver antenna array including one or more groups of receiver radiating elements, where each group of receiver radiating elements includes a first receiver subarray of receiver radiating elements and a second receiver subarray of receiver radiating elements. The phased array antenna further includes receiver core chips, including, for each of the one or more groups of receiver radiating elements, a first receiver core chip associated with the first receiver subarray and a second receiver core chip associated with the second receiver subarray. Additionally, (Continued)

the phased array antenna includes receiver feeding networks, including, for each of the one or more groups of receiver radiating elements, a first receiver feeding network including first feed lines and a second receiver feeding network including second feed lines.

20 Claims, 14 Drawing Sheets

(56) References Cited

U.S. PATENT DOCUMENTS

| | | | | |
|---|---|---|---|---|
| 7,868,828 | B2 * | 1/2011 | Shi | H01Q 21/0006 343/893 |
| 10,020,594 | B2 * | 7/2018 | Kim | H01Q 21/0037 |
| 11,462,837 | B2 * | 10/2022 | Kuwabara | H01Q 21/065 |
| 11,901,633 | B2 * | 2/2024 | Cui | H01Q 1/246 |

OTHER PUBLICATIONS

International Search Report for International Application No. PCT/SG2022/050176 dated Jun. 28, 2022, pp. 1-5.

Boccia et al., "SatCom RX/TX User Terminal Antennas with Intelligent Pixels," European Space Agency Workshop SatCom User Terminal, Oct. 30, 2012, pp. 1-8.

Luo et al., "A Scalable Ka-Band 1024-Element Transmit Dual-Circularly-Polarized Planar Phased Array for SATCOM Application," IEEE Access, vol. 8, Aug. 24, 2020, pp. 156084-156095.

Written Opinion of the International Searching Authority for International Application No. PCT/SG2022/050176 dated Jun. 28, 2022, pp. 1-5.

* cited by examiner

PHASED ARRAY ANTENNA

CROSS-REFERENCE TO RELATED APPLICATION

This application claims the benefit of priority of Singapore Patent Application No. 10202103335X, filed on 31 Mar. 2021, the content of which being hereby incorporated by reference in its entirety for all purposes.

TECHNICAL FIELD

The present invention generally relates to a phased array antenna and a method of manufacturing thereof.

BACKGROUND

SATCOM On-The-Move (SOTM) has wide spread applications in the land, maritime, and aeronautical environments to provide broadband satellite communication service at any time and place. Compared with lower frequency bands, K/Ka-band mobile satellite communication is preferred and has undergone fast development due to its higher channel capacities for a large number of end users, higher data rate links, and smaller user terminals. In order to maintain established SATCOM links while moving, mobile satellite terminals need to be capable of tracking satellites. Thus, lightweight and low profile electronically beam steerable planar phased array antennas may be of major importance for SOTM applications.

K/Ka-band SOTM services and transponders are based on bi-directional satellite communication links at two different frequency bands, namely, transmitter (Tx) uplink at around 30 GHz Ka-band and receiver (Rx) downlink at around 20 GHz K-band. The antenna requirements for Ka-band SOTM user terminal are very challenging. For example, besides lightweight and low profile (e.g., for easily mounting on vehicles or airplanes), the phased array antenna may need to operate in dual bands (covering both Tx and Rx) and provide electronically beam scanning over very wide angles. The phased array antenna may also need to be circularly polarized (CP) with high polarization purity to facilitate efficient transmission between transmitter and receiver. Accordingly, it is desirable to provide a phased array antenna that is both efficient (e.g., maximize antenna gain) and effective (e.g., minimize or avoid grating/side lobes issues and minimize or avoid unbalance loss or phase delay in antenna/radiating element excitations).

A need therefore exists to provide a phased array antenna that seek to overcome, or at least ameliorate, one or more deficiencies associated with conventional phased array antennas, such as improving the efficiency and effectiveness of the phased array antenna. It is against this background that the present invention has been developed.

SUMMARY

According to a first aspect of the present invention, there is provided a phased array antenna comprising:

a receiver antenna array comprising one or more groups of receiver radiating elements, each group of receiver radiating elements comprising a first receiver subarray of receiver radiating elements and a second receiver subarray of receiver radiating elements;

a plurality of receiver core chips, comprising, for each of the one or more groups of receiver radiating elements, a first receiver core chip associated with the first receiver subarray of the group of receiver radiating elements and a second receiver core chip associated with the second receiver subarray of the group of receiver radiating elements; and a plurality of receiver feeding networks, comprising, for each of the one or more groups of receiver radiating elements, a first receiver feeding network comprising a plurality of first feed lines communicatively coupling the first receiver core chip to receiver radiating elements of the first receiver subarray, respectively, of the group of receiver radiating elements, and a second receiver feeding network comprising a plurality of second feed lines communicatively coupling the second receiver core chip to receiver radiating elements of the second receiver subarray, respectively, of the group of receiver radiating elements, wherein the one or more groups of receiver radiating elements are arranged to collectively have at least substantially a uniform diagonal square lattice configuration of receiver radiating elements, and for each of the one or more groups of receiver radiating elements, a first receiver radiating element of the first receiver subarray of the group of receiver radiating elements and the second receiver core chip associated with the second receiver subarray of the group of receiver radiating elements are arranged at least substantially at or along a center of the second receiver subarray and a first receiver radiating element of the second receiver subarray of the group of receiver radiating elements and the first receiver core chip associated with the first receiver subarray of the group of receiver radiating elements are arranged at least substantially at or along a center of the first receiver subarray such that the plurality of first feed lines and the plurality of second feed lines associated with the group of receiver radiating elements have at least substantially equal length.

According to a second aspect of the present invention, there is provided a method of manufacturing a phased array antenna, the method comprising:

forming a receiver antenna array comprising one or more groups of receiver radiating elements, each group of receiver radiating elements comprising a first receiver subarray of receiver radiating elements and a second receiver subarray of receiver radiating elements;

providing a plurality of receiver core chips, comprising, for each of the one or more groups of receiver radiating elements, a first receiver core chip associated with the first receiver subarray of the group of receiver radiating elements and a second receiver core chip associated with the second receiver subarray of the group of receiver radiating elements; and forming a plurality of receiver feeding networks, comprising, for each of the one or more groups of receiver radiating elements, a first receiver feeding network comprising a plurality of first feed lines communicatively coupling the first receiver core chip to receiver radiating elements of the first receiver subarray, respectively, of the group of receiver radiating elements, and a second receiver feeding network comprising a plurality of second feed lines communicatively coupling the second receiver core chip to receiver radiating elements of the second receiver subarray, respectively, of the group of receiver radiating elements, wherein the one or more groups of receiver radiating elements are arranged to collectively have at least substantially a uniform diagonal square lattice configuration of receiver radiating elements, and for each of the one or more groups of receiver radiating elements, a first receiver radiating element of the first receiver subarray of the group of receiver radiating elements and the second receiver core chip associated with the second receiver subarray of the group of receiver radiating elements are arranged at least substantially at or along a center of the second receiver subarray and a first receiver radiating element of the second receiver subarray of the group of receiver radiating elements and the first receiver core chip associated with the first receiver subarray of the group of receiver radiating elements are arranged at least substantially at or along a center of the first receiver subarray such that the plurality of first feed lines and the plurality of second feed lines associated with the group of receiver radiating elements have at least substantially equal length.

BRIEF DESCRIPTION OF THE DRAWINGS

Embodiments of the present invention will be better understood and readily apparent to one of ordinary skill in the art from the following written description, by way of example only, and in conjunction with the drawings, in which.

DETAILED DESCRIPTION

Various embodiments of the present invention provide a phased array antenna and a method of manufacturing the phased array antenna. As discussed in the background, besides lightweight and low profile (e.g., for easily mounting on vehicles or airplanes), it is desirable to provide a phased array antenna that is both efficient (e.g., maximize antenna gain) and effective (e.g., minimize or avoid grating/side lobes issues and minimize or avoid unbalance loss or phase delay in antenna/radiating element excitations). Accordingly, various embodiments provide a phased array antenna that seek to overcome, or at least ameliorate, one or more deficiencies associated with conventional phased array antennas, such as improving the efficiency and effectiveness of the phased array antenna.

Figure 1:
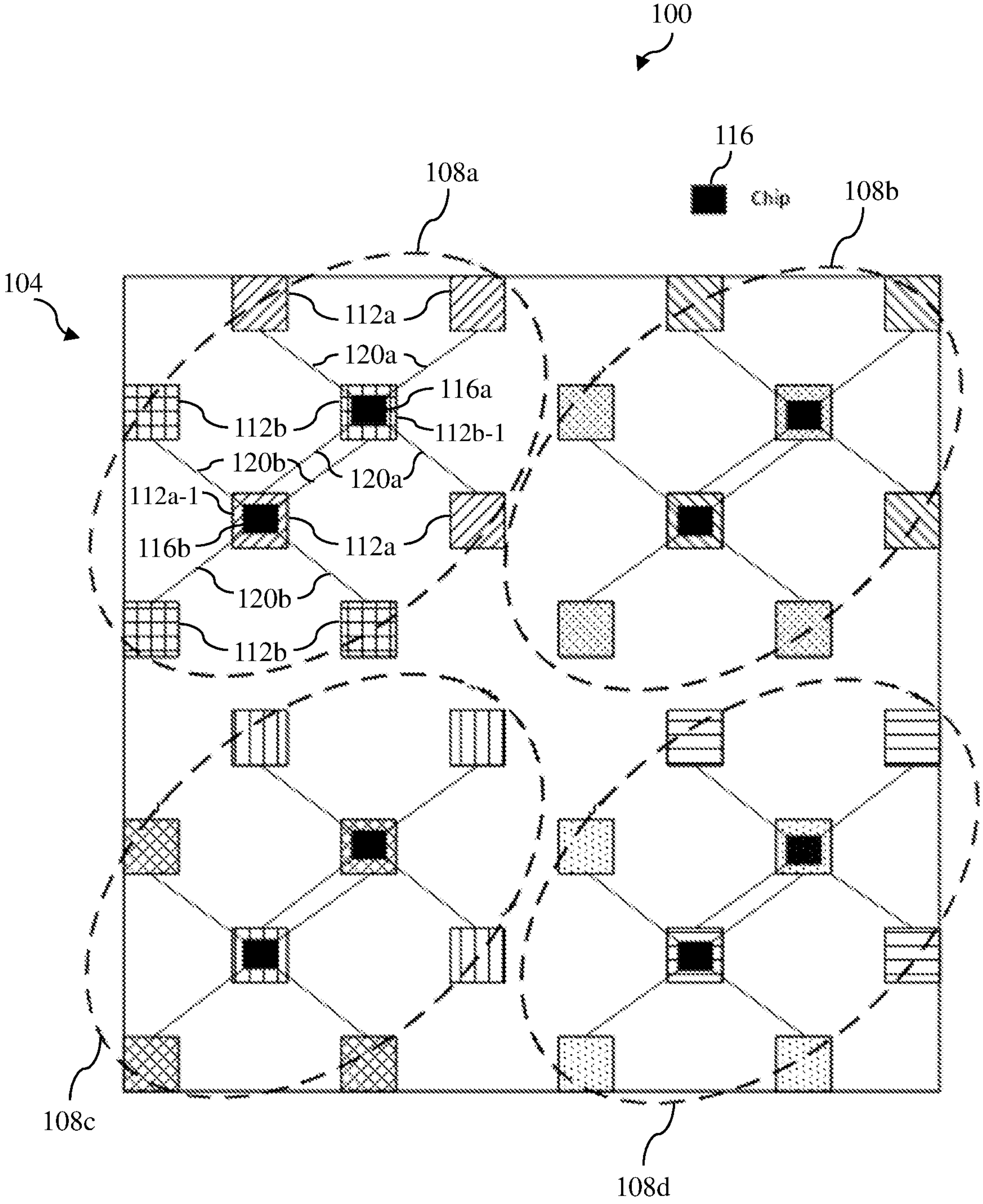
FIG. 1 depicts a schematic drawing of a phased array antenna, including a receiver antenna array, according to various embodiments of the present invention.

FIG. 1 depicts a schematic drawing of a phased array antenna 100 according to various embodiments of the present invention. The phased array antenna 100 comprises: a receiver antenna array 104 comprising one or more groups 108*a*-108*d* of receiver radiating elements (which may also interchangeably be referred to as receiver antenna elements), each group of receiver radiating elements comprising a first receiver subarray (e.g., 112*a* for the group 108*a*) of receiver radiating elements and a second receiver subarray (e.g., 112*b* for the group 108*a*) of receiver radiating elements; a plurality of receiver core chips 116, comprising, for each of the one or more groups 108*a*-108*d* of receiver radiating elements, a first receiver core chip (e.g., 116*a* for the group 108*a*) associated with the first receiver subarray (e.g., 112*a*) of the group (e.g., 108*a*) of receiver radiating elements and a second receiver core chip (e.g., 116*b* for the group 108*a*) associated with the second receiver subarray (e.g., 112*b*) of the group (e.g., 108*a*) of receiver radiating elements; and a plurality of receiver feeding networks, comprising, for each of the one or more groups 108*a*-108*d* of receiver radiating elements, a first receiver feeding network (e.g., 120*a* for the group 108*a*) comprising a plurality of first feed lines communicatively coupling (e.g., and extending from) the first receiver core chip (e.g., 116*a*) to receiver radiating elements of the first receiver subarray (e.g., 112*a*), respectively, of the group (e.g., 108*a*) of receiver radiating elements, and a second receiver feeding network (e.g., 120*b* for the group 108*a*) comprising a plurality of second feed lines communicatively coupling (e.g., and extending from) the second receiver core chip (e.g. 116*b*) to receiver radiating elements of the second receiver subarray (e.g., 112*b*), respectively, of the group (e.g., 108*a*) of receiver radiating elements.

In addition, the one or more groups 108*a*-108*d* of receiver radiating elements are arranged (or positioned) to collectively have at least substantially a uniform diagonal square lattice configuration (which may also interchangeably be referred to as a checkered pattern configuration) of receiver radiating elements. In particular, for each of the one or more groups 108a-108d of receiver radiating elements, a first receiver radiating element (e.g., 112a-1) of the first receiver subarray (e.g., 112a) of the group (e.g., 108a) of receiver radiating elements and the second receiver core chip (e.g., 116b) associated with the second receiver subarray (e.g., 112b) of the group (108a) of receiver radiating elements are arranged (or positioned) at least substantially at or along a center of the second receiver subarray (e.g., 112b) and a first receiver radiating element (e.g., 112b-1) of the second receiver subarray (e.g., 112b) of the group (e.g., 108a) of receiver radiating elements and the first receiver core chip (e.g., 116a) associated with the first receiver subarray (112a) of the group (e.g., 108a) of receiver radiating elements are arranged (or positioned) at least substantially at or along a center of the first receiver subarray (e.g., 112a) such that the plurality of first feed lines (e.g., 120a) and the plurality of second feed lines (e.g., 120b) associated with the group (e.g., 108a) of receiver radiating elements have at least substantially equal length.

In various embodiments, the first receiver radiating element (e.g., 112a-1) of the first receiver subarray (e.g., 112a) may be arranged at least substantially at the center of the second receiver subarray (e.g., 112b) and the second receiver core chip (e.g., 116b) may be arranged at least substantially along the center (e.g., along a central axis) of the second receiver subarray (e.g., 112b). Similarly, the first receiver radiating element (e.g., 112b-1) of the second receiver subarray (e.g., 112b) may be arranged at least substantially at the center of the first receiver subarray (e.g., 112a) and the first receiver core chip (e.g., 116a) may be arranged at least substantially along the center (e.g., along a central axis) of the first receiver subarray (e.g., 112a).

It will be understood by a person skilled in the art that a center of a subarray of radiating elements refers a center with respect to (or amongst) all radiating elements of the subarray. For example, with reference to the first receiver subarray 112a shown in FIG. 1, as illustrated, a center of the first receiver subarray 112a is a center with respect to all receiver radiating elements of the first receiver subarray 112a.

It will be understood by a person skilled in the art that, although FIG. 1 illustrates a plurality of groups 108a-108d of receiver radiating elements, the phased array antenna 100 is not limited to having multiple groups of receiver radiating elements. In particular, as described above, the phased array antenna 100 may comprise one group of receiver radiating elements or more groups. Furthermore, for clarity and conciseness, only components or elements of, or associated with, one group 108a of receiver radiating elements are denoted with reference numerals in FIG. 1. In this regard, it will be understood by a persons skilled in the art that components or elements of, or associated with, the group 108a of receiver radiating elements described herein according to various embodiments also apply (in the same or similar manner) to the same or corresponding components or elements of, or associated with, any other group (e.g., 108b to 108d) of receiver radiating elements of the receiver antenna array 104, which are simply not repeated with respect to such other group (e.g., 108b to 108d) of receiver radiating elements for clarity and conciseness.

It will be understood by a person skilled in the art that the phrase "at least substantially" in the above-described "arranged at least substantially at or along a center" is intended to cover being arranged at or along a center or substantially thereof. For example, it will be understood that while it is preferred to arrange at or along the center, slight variations (e.g., slight or redundant adjustments such that it may not be exactly at or along the center) with negligible effect or without materially affecting the intended outcome are covered within the scope of the present invention. Similarly, the phrase "at least substantially" in the above-described "have at least substantially a uniform diagonal square lattice configuration" covers having a uniform diagonal square or substantially thereof, and the phrase "at least substantially" in the above-described "have at least substantially equal length" covers having equal length or substantially thereof.

Accordingly, the above-described configuration of the receiver antenna array 104 and the plurality of receiver feeding networks associated with the receiver antenna array 104 advantageously enable all feed lines of the plurality of receiver feeding networks to have at least substantially equal length, while still being able to utilize (able to excite) all receiver radiating elements of the receiver antenna array 104. As a result, the antenna gain is maximized or improved, grating/side lobes issues are minimized or avoided and unbalance loss or phase delay in radiating element excitations is minimized or avoided, which advantageously improves antenna efficiency and effectiveness. These advantages or technical effects, and/or other advantages or technical effects, will become more apparent to a person skilled in the art as the phased array antenna 100 is described in more detail according to various embodiments and example embodiments of the present invention.

In various embodiments, for each of the one or more groups 108a-108d of receiver radiating elements, the first receiver core chip (e.g., 116a) associated with the first receiver subarray (e.g., 112a) of the group (e.g., 108a) of receiver radiating elements is configured to excite the receiver radiating elements of the first receiver subarray (e.g., 112a) via the first receiver feeding network (e.g., 120a) to circularly polarize the receiver radiating elements of the first receiver subarray (e.g., 112a). Similarly, for each of the one or more groups 108a-108d of receiver radiating elements, the second receiver core chip (e.g., 116b) associated with the second receiver subarray (e.g., 112b) of the group (e.g., 108a) of receiver radiating elements is configured to excite the receiver radiating elements of the second receiver subarray (e.g., 112b) via the second receiver feeding network (e.g., 120b) to circularly polarize the receiver radiating elements of the second receiver subarray (e.g., 112b).

In various embodiments, for each of the one or more groups 108a-108d of receiver radiating elements, the first receiver subarray (e.g., 112a) and the second receiver subarray (e.g., 112b) of the group (e.g., 108a) of receiver radiating elements each has a dimension of 2×2 (i.e., 2×2 receiver radiating elements). In various embodiments, the first receiver core chip (e.g., 116a) associated with the first receiver subarray (e.g., 112a) of the group (e.g., 108a) of receiver radiating elements is configured to excite the receiver radiating elements of the first receiver subarray (e.g., 112a) with identical amplitude and 90° phase difference (e.g., sequential phases of 0°, 90°, 180° and 270° for four receiver radiating elements, respectively, of the first receiver subarray (e.g., 112a)). In various embodiments, similarly, the second receiver core chip (e.g., 116b) associated with the second receiver subarray (e.g., 112b) of the group (e.g., 108a) of receiver radiating elements is configured to excite the receiver radiating elements of the second receiver subarray (e.g., 112b) with identical amplitude and 90° phase difference (e.g., sequential phases of 0°, 90°, 180° and 270° for four receiver radiating elements, respectively, of the second receiver subarray (e.g., 112*b*)).

In various embodiments, in the uniform diagonal square lattice configuration of receiver radiating elements, immediately diagonally adjacent receiver radiating elements are located a distance of about $0.5\lambda_{Rx}$ apart, whereby $\lambda_{Rx}$ denotes the free space wavelength at 20 GHz.

In various embodiments, the phased array antenna 100 further comprises: a transmitter antenna array (not shown in FIG. 1) comprising a plurality of transmitter subarrays of transmitter radiating elements (which may also interchangeably be referred to as transmitter antenna elements); a plurality of transmitter core chips (not shown in FIG. 1), comprising, for each of the plurality of transmitter subarrays, a transmitter core chip associated with the transmitter subarray; and a plurality of transmitter feeding networks (not shown in FIG. 1), comprising, for each of the plurality of transmitter subarrays, a transmitter feeding network comprising a plurality of feed lines communicatively coupling (e.g., and extending from) the transmitter core chip to transmitter radiating elements of the transmitter subarray, respectively. In addition, the plurality of transmitter subarrays are arranged to collectively have at least substantially a uniform square lattice configuration of transmitter radiating elements. Furthermore, for each of the plurality of transmitter subarrays, the transmitter core chip associated with the transmitter subarray is arranged at least substantially along a center of the transmitter subarray such that the plurality of feed lines associated with the transmitter subarray have at least substantially equal length.

Similar to that explained hereinbefore, the phase "at least substantially" in the above-described "have at least substantially a uniform square lattice configuration" covers having a uniform square or substantially thereof, the phrase "at least substantially" in the above-described "arranged at least substantially along a center" covers being arranged along a center or substantially thereof, and the phase "at least substantially" in the above-described "have at least substantially equal length" covers having equal length or substantially thereof.

Accordingly, in various embodiments, the phased array antenna 100 comprises the receiver antenna array 104 and the transmitter antenna array so as to be operable in dual bands covering both Tx and Rx.

In various embodiments, for each of the plurality of transmitter subarrays, the transmitter core chip associated with the transmitter subarray is configured to excite the transmitter radiating elements of the transmitter subarray via the transmitter feeding network to circularly polarize the transmitter radiating elements of the transmitter subarray.

In various embodiments, for each of the plurality of transmitter subarrays, the transmitter subarray has a dimension of 2×2 (i.e., 2×2 transmitter radiating elements). In various embodiments, the transmitter core chip associated with the transmitter subarray is configured to excite the transmitter radiating elements of the transmitter subarray with identical amplitude and 90° phase difference (e.g., sequential phases of 0°, 90°, 180° and 270° for four transmitter radiating elements, respectively, of the transmitter subarray).

In various embodiments, in the uniform square lattice configuration of transmitter radiating elements, immediately adjacent transmitter radiating elements are located a distance of about $0.5\lambda_{Tx}$ apart, whereby $\lambda_{Tx}$ denotes the free space wavelength at 30 GHz.

In various embodiments, the receiver antenna array 104 and the transmitter antenna array (not shown in FIG. 1) are formed in different layers of a multilayer substrate (e.g., a multilayer substrate constituting a single antenna board). Furthermore, a plurality of receiver radiating elements of the receiver antenna array are respectively co-located along an axis with a plurality of transmitter radiating elements of the transmitter antenna array to have a multilayer shared aperture configuration.

In various embodiments, the phased array antenna 100 comprises an array of adjoined antenna modules (e.g., side by side), comprising: a first antenna module and one or more additional antenna modules. In various embodiments, each antenna module comprises a receiver antenna array; a plurality of receiver core chips; and a plurality of receiver feeding networks configured or arranged in the same or similar manner as the receiver antenna array 104; the plurality of receiver core chips 116; and the plurality of receiver feeding networks as described hereinbefore according to various embodiments and thus need not be repeated for clarity and conciseness. In various embodiments, each antenna module further comprises a transmitter antenna array; a plurality of transmitter core chips; and a plurality of transmitter feeding networks configured or arranged in the same or similar manner as the transmitter antenna array; the plurality of transmitter core chips; and the plurality of transmitter feeding networks as described hereinbefore according to various embodiments and thus need not be repeated for clarity and conciseness. For example, it will be understood by a persons skilled in the art that the array of adjoined antenna modules may comprise any number of antenna modules as desired or as appropriate, such as depending on the desired planar dimension of the phased array antenna 100. Accordingly, the phased array antenna 100 according to various embodiments of the present invention advantageously provides array modularity and scalability.

Figure 2:
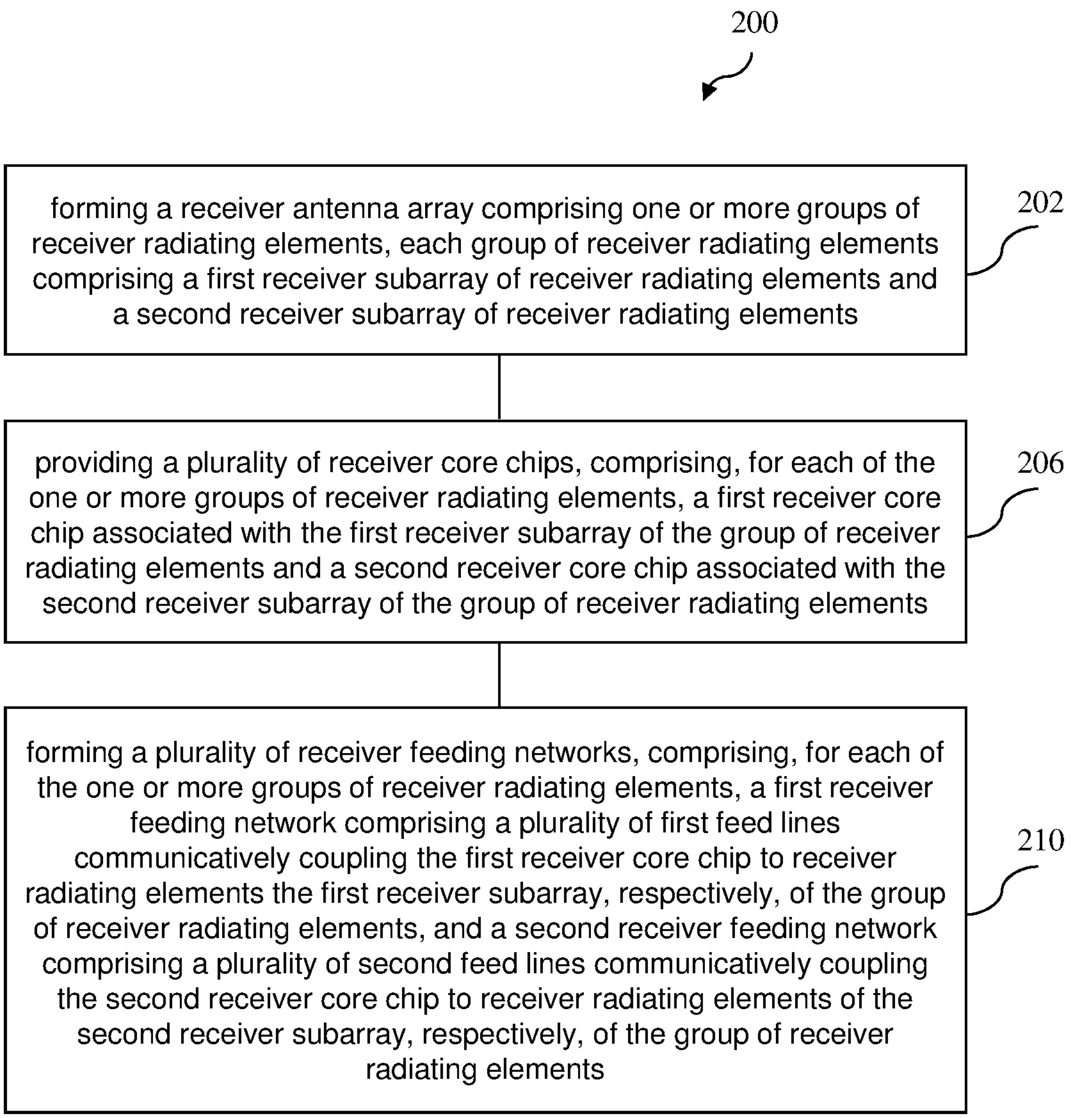
FIG. 2 depicts a schematic drawing of a method of manufacturing a phased array antenna, including a receiver antenna array, according to various embodiments of the present invention.

FIG. 2 depicts a schematic flow diagram of a method 200 of manufacturing a phased array antenna according to various embodiments of the present invention, such as the phased array antenna 100 as described hereinbefore with reference to FIG. 1. The method 200 comprises: forming (at 202) a receiver antenna array 104 comprising one or more groups 108*a*-108*d* of receiver radiating elements, each group of receiver radiating elements comprising a first receiver subarray (e.g., 112*a* for the group 108*a*) of receiver radiating elements and a second receiver subarray (e.g., 112*b* for the group 108*a*) of receiver radiating elements; providing (at 206) a plurality of receiver core chips 116, comprising, for each of the one or more groups 108*a*-108*d* of receiver radiating elements, a first receiver core chip (e.g., 116*a* for the group 108*a*) associated with the first receiver subarray (e.g., 112*a*) of the group (e.g., 108*a*) of receiver radiating elements and a second receiver core chip (e.g., 116*b* for the group 108*a*) associated with the second receiver subarray (e.g., 112*b*) of the group (e.g., 108*a*) of receiver radiating elements; and forming (at 210) a plurality of receiver feeding networks, comprising, for each of the one or more groups 108*a*-108*d* of receiver radiating elements, a first receiver feeding network (e.g., 120*a* for the group 108*a*) comprising a plurality of first feed lines communicatively coupling the first receiver core chip (e.g., 116*a*) to receiver radiating elements of the first receiver subarray (e.g., 112*a*), respectively, of the group (e.g., 108*a*) of receiver radiating elements, and a second receiver feeding network (e.g., 120*b* for the group 108*a*) comprising a plurality of second feed lines communicatively coupling the second receiver core chip (e.g. 116*b*) to receiver radiating elements of the second receiver subarray (e.g., 112*b*), respectively, of the group (e.g., 108*a*) of receiver radiating elements.

In addition, the one or more groups 108*a*-108*d* of receiver radiating elements are arranged to collectively have at least substantially a uniform diagonal square lattice configuration (which may also interchangeably be referred to as a checkered pattern configuration) of receiver radiating elements. In particular, for each of the one or more groups 108*a*-108*d* of receiver radiating elements, a first receiver radiating element (e.g., 112*a*-1) of the first receiver subarray (e.g., 112*a*) of the group (e.g., 108*a*) of receiver radiating elements and the second receiver core chip (e.g., 116*b*) associated with the second receiver subarray (e.g., 112*b*) of the group (108*a*) of receiver radiating elements are arranged at least substantially at or along a center of the second receiver subarray (e.g., 112*b*) and a first receiver radiating element (e.g., 112*b*-1) of the second receiver subarray (e.g., 112*b*) of the group (e.g., 108*a*) of receiver radiating elements and the first receiver core chip (e.g., 116*a*) associated with the first receiver subarray (e.g., 112*a*) of the group (e.g., 108*a*) of receiver radiating elements are arranged at least substantially at or along a center of the first receiver subarray (e.g., 112*a*) such that the plurality of first feed lines (e.g., 120*a*) and the plurality of second feed lines (e.g., 120*b*) associated with the group (e.g., 108*a*) of receiver radiating elements have at least substantially equal length.

In various embodiments, the method 200 is for manufacturing the phased array antenna 100 as described hereinbefore with reference to FIG. 1, therefore, various steps or operations of the method 200 may correspond to forming, providing or configuring various components or elements of the phased array antenna 100 as described hereinbefore according to various embodiments, and thus such corresponding steps or operations need not be repeated with respect to the method 200 for clarity and conciseness. In other words, various embodiments described herein in context of the phased array antenna 100 are analogously valid for the method 200 (e.g., for manufacturing the phased array antenna 100 having various components and configurations as described hereinbefore according to various embodiments), and vice versa. In various embodiments, standard manufacturing technologies or techniques known in the art may be employed to manufacture the phased array antenna 100 according to the configurations of the phased array antenna 100 as described hereinbefore according to various embodiments of the present invention, and thus such standard manufacturing technologies or techniques need not be described herein in detail, such as but not limited to, multilayer low temperature co-fired ceramic (LTCC) techniques, multilayer printed circuit board (PCB) techniques and so on.

For example, in relation to the receiver antenna array 104 comprising one or more groups 108*a*-108*d* of receiver radiating elements as described hereinbefore with respect to the phased array antenna 100 according to various embodiments, the method 200 for manufacturing the phased array antenna 100 may thus comprise forming the receiver antenna array 104 comprising one or more groups 108*a*-108*d* of receiver radiating elements having a configuration as described hereinbefore with respect to the phased array antenna 100 according to various embodiments.

It will be appreciated to a person skilled in the art that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Any reference to an element or a feature herein using a designation such as "first", "second" and so forth does not necessarily limit the quantity or order of such elements or features, unless stated or the context requires otherwise. For example, such designations may be used herein as a convenient way of distinguishing between two or more elements or instances of an element. Thus, a reference to first and second elements does not necessarily mean that only two elements can be employed, or that the first element must precede the second element. In addition, a phrase referring to "at least one of" a list of items (or the like, such as "one or more of") refers to any single item therein or any combination of two or more items therein.

In order that the present invention may be readily understood and put into practical effect, various example embodiments of the present inventions will be described hereinafter by way of examples only and not limitations. It will be appreciated by a person skilled in the art that the present invention may, however, be embodied in various different forms and should not be construed as limited to the example embodiments set forth hereinafter. Rather, these example embodiments are provided so that this disclosure will be thorough and complete, and will fully convey the scope of the present invention to those skilled in the art.

In particular, for better understanding of the present invention and without limitation or loss of generality, various example embodiments of the present invention will now be described with respect to a phased array antenna configured or suitable for SATCOM On-The-Move (SOTM) applications.

As discussed in the background, SOTM has wide spread applications in the land, maritime, and aeronautical environments to provide broadband satellite communication service at any time and place. Compared with lower frequency bands, K/Ka-band mobile satellite communication is preferred and has undergone fast development due to its higher channel capacities for a large number of end users, higher data rate links, and smaller user terminals. In order to maintain established SATCOM links while moving, mobile satellite terminals need to be capable of tracking satellites. Thus, lightweight and low profile electronically beam steerable planar phased array antennas may be of major importance for SOTM applications.

K/Ka-band SOTM services and transponders are based on bi-directional satellite communication links at two different frequency bands, namely, transmitter (Tx) uplink at around 30 GHz Ka-band and receiver (Rx) downlink at around 20 GHz K-band. The antenna requirements for Ka-band SOTM user terminal are very challenging. For example, besides lightweight and low profile (e.g., for easily mounting on vehicles or airplanes), the phased array antenna may need to operate in dual bands (covering both Tx and Rx) and provide electronically beam scanning over very wide angles. The phased array antenna may also need to be circularly polarized (CP) with high polarization purity to facilitate efficient transmission between transmitter and receiver. Accordingly, it is desirable to provide a phased array antenna for SOTM applications that is both efficient (e.g., maximize antenna gain) and effective (e.g., minimize or avoid grating/side lobes issues and minimize or avoid unbalance loss or phase delay in antenna/radiating element excitations).

Figure 3:
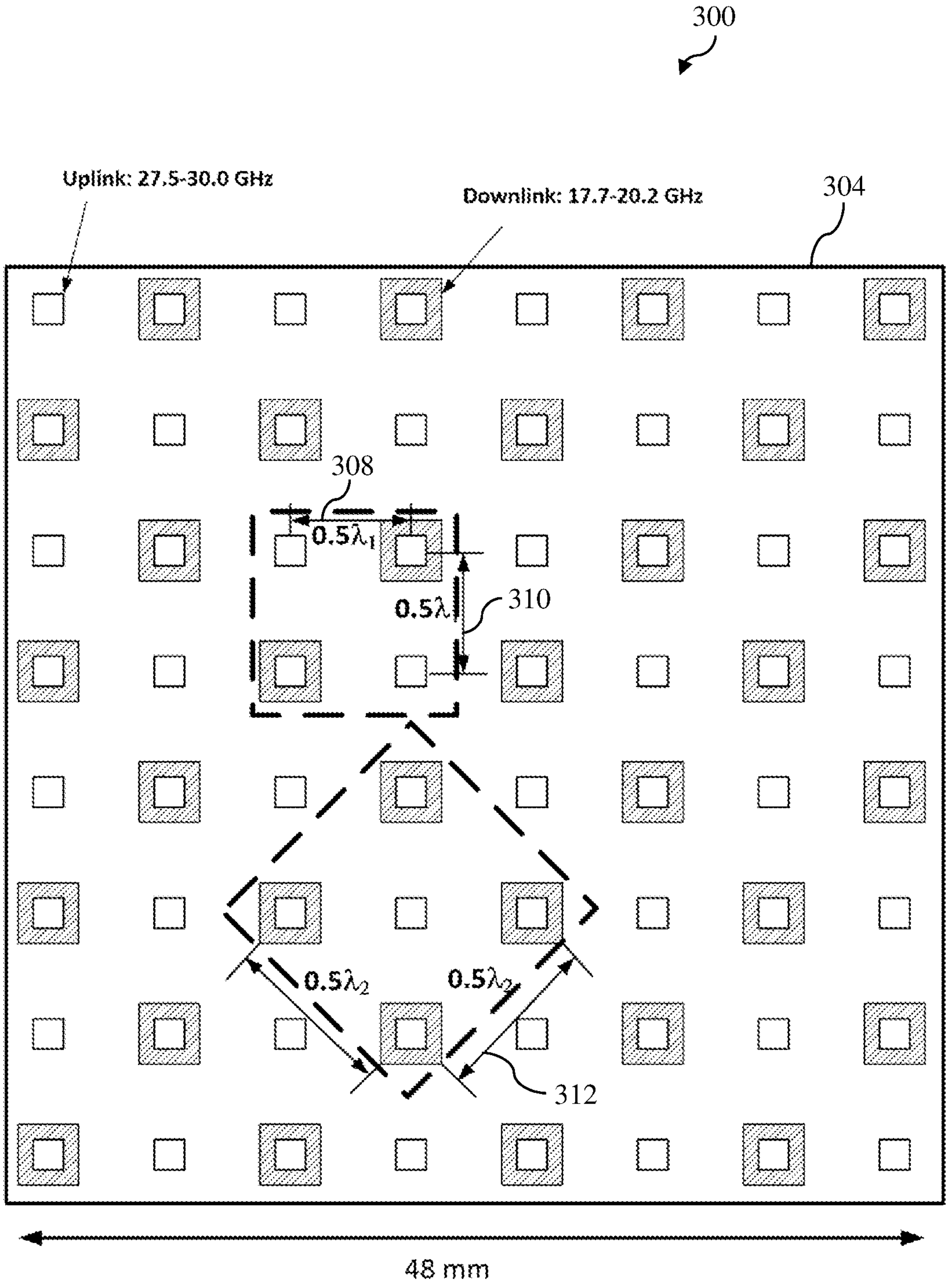
FIG. 3 depicts a schematic drawing of a phased array antenna, including a transmitter antenna array and a receiver antenna array having an interleaved arrangement on a radiating surface, according to various example embodiments of the present invention.

To achieve a compact low profile antenna system, various example embodiments provide an architecture to combine the transmitter (Tx) radiating elements (which may also interchangeably be referred to as transmitter (Tx) antenna elements) and receiver (Rx) radiating elements (which may also interchangeably be referred to as receiver (Rx) antenna elements) into a single antenna board (e.g., a multilayer substrate). FIG. 3 depicts a schematic drawing of a phased array antenna 300 according to various example embodiments of the present invention (e.g., corresponding to the phased array antenna 100 as described hereinbefore according to various embodiments). The phased array antenna 300 comprises a receiver antenna array (comprising a plurality of receiver subarrays of receiver radiating elements (e.g., at 20 GHz K-band) and illustrated in FIG. 3 as shaded or hashed square blocks) and a transmitter antenna array (comprising a plurality of transmitter subarrays of transmitter radiating elements (e.g., at 30 GHz Ka-band) and illustrated in FIG. 3 as clear square blocks) formed on a substrate 304 (e.g., a multilayer substrate constituting a single antenna board). By way of an example only and without limitations, as shown in FIG. 3, the phased array antenna 300 may comprise 64 transmitter antenna elements and 32 receiver antenna elements having an interleaved arrangement in the substrate 304. It will be appreciated by a person skilled in the art that the number of transmitter antenna elements and the number receiver antenna elements formed in the substrate 304 are not limited to 64 and 32, respectively, and other number of transmitter antenna elements and other number of receiver antenna elements may be formed in the substrate 304 as desired or as appropriate, such as depending on the planar dimension of the substrate 304 (or antenna board).

In various example embodiments, the whole array structure (e.g., the receiver and transmitter antenna arrays together) may be implemented by or formed using a multilayer printed circuit board (PCB) process or a low temperature co-fired ceramic (LTCC) process. As shown in FIG. 3, the transmitter antenna elements are uniformly disposed on a square lattice (i.e., having a uniform square lattice configuration) whereby adjacent transmitter antenna elements are spaced about $0.5\lambda_1$ apart (whereby $\lambda_1$ denotes the free space wavelength at 30 GHZ) in both the horizontal direction 308 and the vertical direction 310.

Various example embodiments note that if the receiver antenna elements are also uniformly disposed on a square lattice, the element spacing of the receiver antenna elements along the horizontal and vertical directions would be $0.75\lambda_2$ (where $\lambda_2$ denotes the free space wavelength at GHZ). However, various example embodiments note that such a uniform square lattice configuration for the receiver antenna elements may be undesirable for the receiver antenna array due to grating lobe suppression. To address or overcome this problem, according to various example embodiments, the receiver antenna elements are not positioned on a uniform square lattice but are positioned on a uniform diagonal square lattice (which may also interchangeably be referred to as uniform checkered pattern) as illustrated in FIG. 3. Such an arrangement or configuration advantageously results in the diagonal distance 312 between adjacent receiver antenna elements being about $0.5\lambda_2$ at 20 GHz.

Accordingly, by way of an example only and without limitations, FIG. 3 depicts a schematic drawing of a phased array antenna 300 comprising a substrate 304 (e.g., a single antenna board) hosting 64 transmitter antenna elements and 32 receiver antenna elements having an interleaved arrangement in the substrate 304. In various example embodiments, the receiver antenna array and the transmitter antenna array are formed in different layers of a multilayer substrate 304. In various example embodiments, as shown in FIG. 3, a plurality of receiver radiating elements of the receiver antenna array are respectively co-located along an axis with a plurality of transmitter radiating elements of the transmitter antenna array to have a multilayer shared aperture configuration.

For an electronically beam steerable antenna array, various example embodiments integrate the antenna elements, the feeding networks, and the core chips (e.g., beam forming Tx/Rx core chips or phase shifter front end chips) in a modular antenna board with multilayer substrate. Moreover, to achieve better CP radiation (measured as axial ratio (AR)), the antenna elements are arranged as 2×2 subarrays with sequentially rotated feeding mechanism, whereby adjacent antenna elements are excited with identical amplitude and 90° phase difference accordingly. In various example embodiments, the 90° phase difference for the antenna elements of the 2×2 subarray is configured by the associated core chip, and each feeding network comprises feed lines having equal routing length from the associated core chip outputs to the associated antenna elements, respectively, with identical path loss/phase delay, so that the four antenna elements of the 2×2 subarray can be excited with identical amplitude and 90° phase accordingly.

Figure 4:
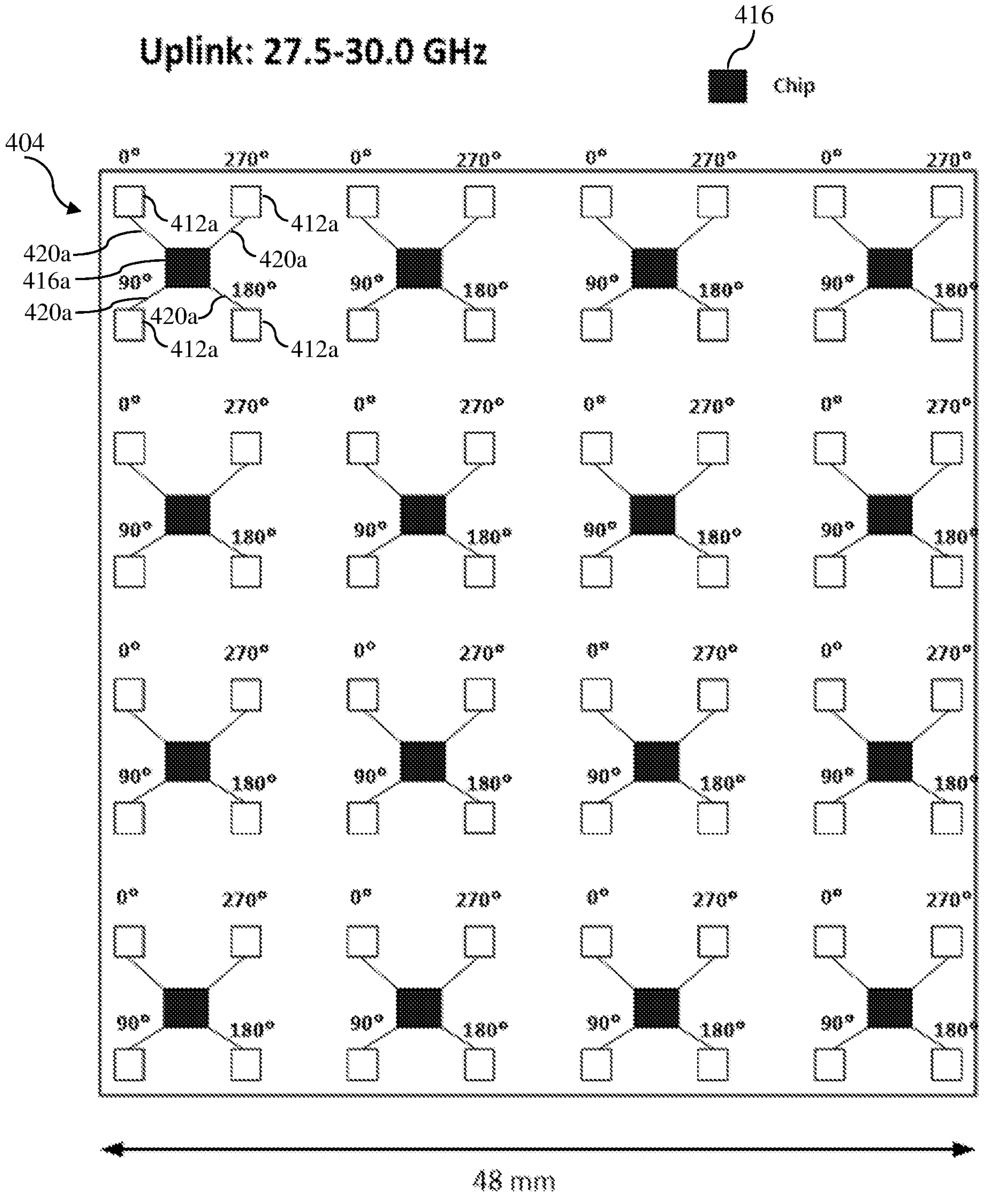
FIG. 4 depicts a schematic drawing of a configuration of a transmitter antenna array of the phased array antenna, along with a configuration of transmitter core chips and transmitter feeding networks to transmitter antenna elements, according to various example embodiments of the present invention.

FIG. 4 depicts a schematic drawing of a configuration or an arrangement of the transmitter antenna array 404 of the phased array antenna 300, along with a configuration of the transmitter core chips 416 and the transmitter feeding networks, according to various example embodiments of the present invention. The transmitter antenna array 404 comprises a plurality of transmitter subarrays (e.g., 412*a* being one of the plurality of transmitter subarrays shown in FIG. 4) of transmitter antenna elements; a plurality of transmitter core chips 416, comprising, for each of the plurality of transmitter subarrays, a transmitter core chip (e.g., 416*a* for the transmitter subarray 412*a*) associated with the transmitter subarray (e.g., 412*a*); and a plurality of transmitter feeding networks (e.g., 420*a* being a transmitter feeding network associated with the transmitter subarray 412*a*), comprising, for each of the plurality of transmitter subarrays, a transmitter feeding network (e.g., 420*a*) comprising a plurality of feed lines communicatively coupling (and extending from) the transmitter core chip (e.g., 416*a*) to transmitter antenna elements of the transmitter subarray (e.g., 412*a*), respectively. As described hereinbefore and as shown in FIG. 4, the plurality of transmitter subarrays are arranged to collectively have a uniform square lattice configuration of transmitter antenna elements. Furthermore, for each of the plurality of transmitter subarrays, the transmitter core chip (e.g., 416*a*) associated with the transmitter subarray (e.g., 412*a*) is arranged along a center of the transmitter subarray (e.g., 412*a*) such that the plurality of feed lines (e.g., 420*a*) associated with the transmitter subarray (412*a*) have equal length.

It will be understood by a person skilled in the art that FIG. 4 illustrates a plurality of transmitter subarrays, but for clarity and conciseness, only components or elements of, or associated with, one transmitter subarray 412*a* of transmitter antenna elements are denoted with reference numerals in FIG. 4. In this regard, it will be understood by a person skilled in the art that components or elements of, or associated with, the transmitter subarray 412*a* of transmitter antenna elements described herein according to various example embodiments also apply (in the same or similar manner) to the same or corresponding components or elements of, or associated with, any other transmitter subarray of transmitter antenna elements of the transmitter antenna array 404, which are simply not repeated with respect to such other transmitter subarray of transmitter antenna elements for clarity and conciseness.

Accordingly, in various example embodiments, for the transmitter (uplink) antenna array 404 with uniform square lattice configuration, for each transmitter subarray (e.g., 412*a*), the transmitter feeding network (e.g., 420*a*) associated with the transmitter subarray (e.g., 412*a*) is configured with feed lines having identical length routing between the transmitter core chip (e.g., 416*a*) and the transmitter antenna elements, respectively, of the transmitter subarray (e.g., 412*a*) connected thereto. As an example, the transmitter core chip (e.g., 416*a*) may be provided or disposed at a layer behind (or below, e.g., immediately adjacent layer) the transmitter subarray (e.g., 412*a*) and located along a center (e.g., a central axis) of the transmitter subarray (e.g., 2×2 transmitter subarray) (e.g., 412*a*), and the transmitter feeding network (e.g., 420*a*) may be configured with four feed lines communicatively coupled to the four transmitter antenna elements (e.g., 412*a*), respectively, of the transmitter subarray (e.g., 412*a*), whereby the four feed lines (e.g., 420*a*) advantageously have identical path loss/phase delay. Furthermore, as shown in FIG. 4, each transmitter subarray (e.g., 412*a*) may comprise sequentially rotated transmitter antenna elements (e.g., sequential phases of 0°, 90°, 180° and 270° for four transmitter antenna elements, respectively, of the transmitter subarray). Accordingly, FIG. 4 depicts a schematic drawing illustrating a configuration or an arrangement of the transmitter antenna array 404 with balanced feeding networks from transmitter core chips to sequentially rotated transmitter antenna elements.

For a receiver (downlink) antenna array with uniform checkered pattern configuration, it is challenging to arrange the receiver core chips to maximize antenna gain while minimizing or avoiding grating/side lobes issues and minimizing or avoiding unbalance loss or phase delay in antenna element excitations. To demonstrate this technical difficulty, FIGS. 5A and 5B depict schematic drawings illustrating two example configurations of a receiver antenna array, along with an example arrangement or configuration of the receiver core chips and the receiver feeding networks to the sequential rotated receiver antenna elements.

Figure 5A:
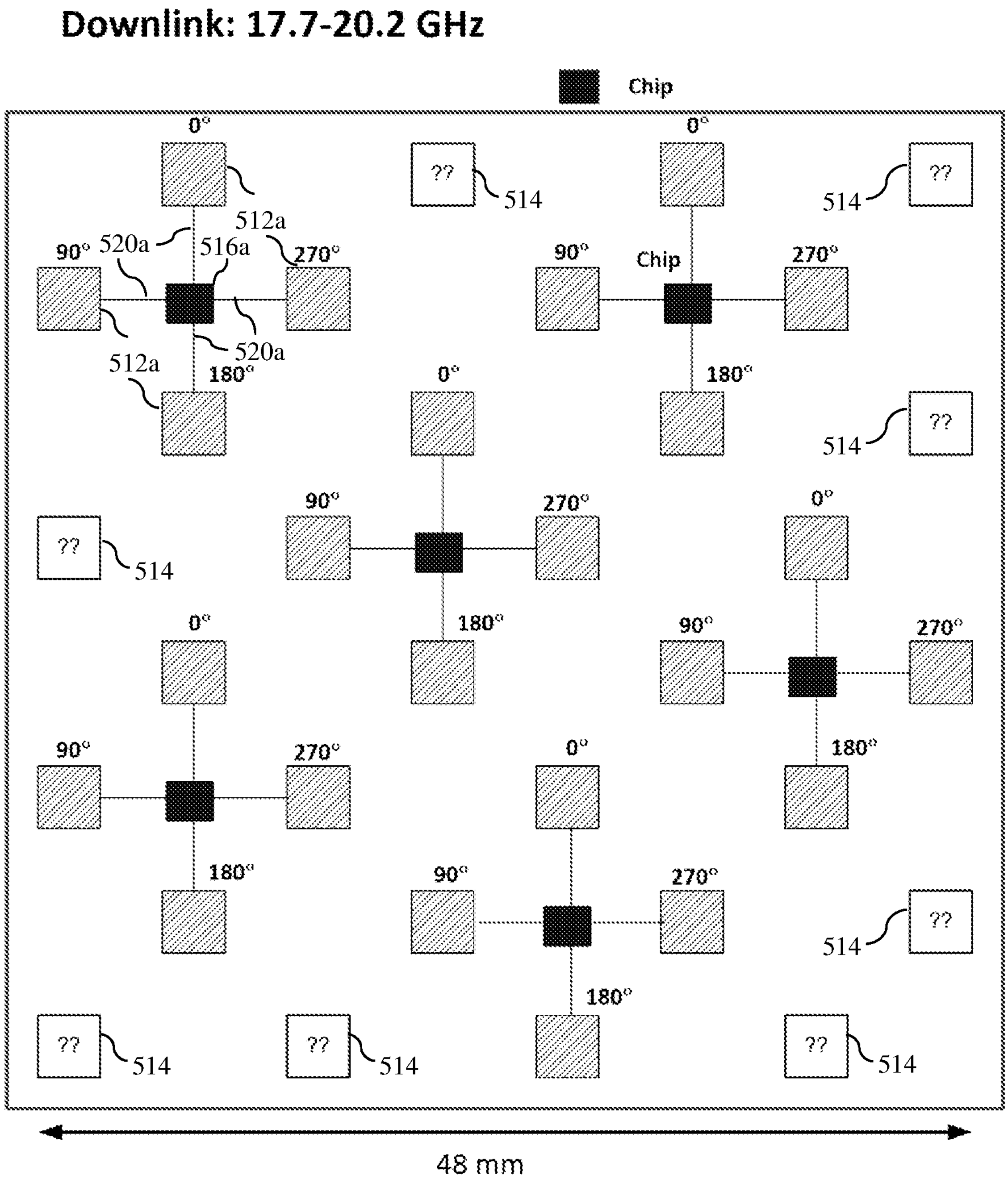
FIGS. 5A and 5B depict schematic drawings illustrating two example configurations of a receiver antenna array, along with an example configuration of receiver core chips and receiver feeding networks to receiver antenna elements.

For the example configuration illustrated in FIG. 5A, the equal length routing of the feeding networks (e.g., feeding network 520*a* associated with the receiver subarray 512*a*) provides identical path loss/phase delay from the receiver core chips (e.g., 516*a* for receiver subarray 512*a*) to the receiver antenna elements (e.g., 512*a*), but unfortunately as shown in FIG. 5A, a number of receiver antenna elements 514 are not communicatively coupled to any receiver core chip and thus cannot be excited. As a result, the antenna efficiency of the receiver antenna array having the example configuration shown in FIG. 5A will be degraded and the antenna gain thereof would thus drop. Moreover, the unutilized receiver antenna elements 514 of the receiver antenna array may cause grating/side lobes issues when the receiver antenna array is used to configure a large high gain antenna array.

Figure 5B:
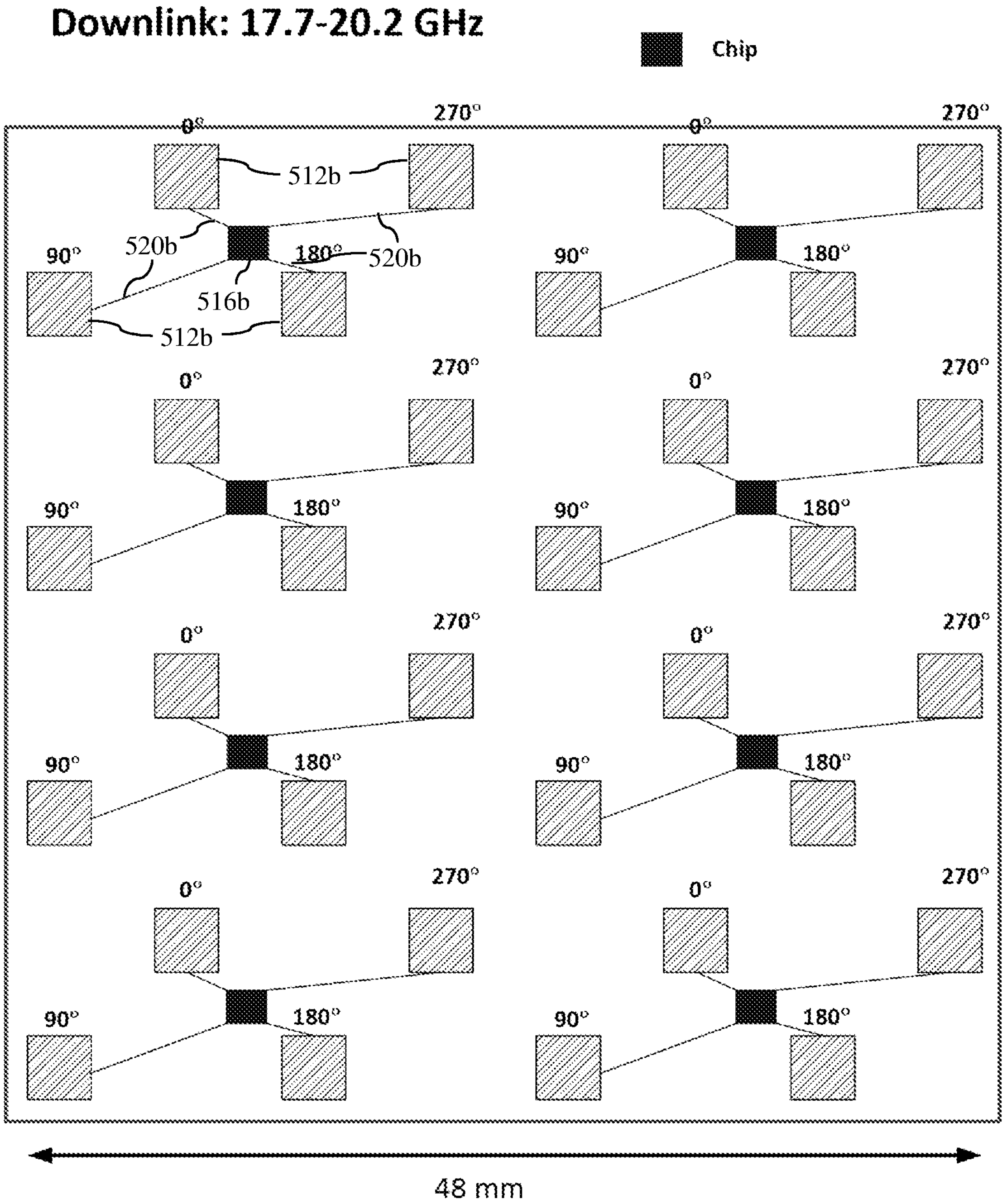

On the other hand, for the example configuration shown in FIG. 5B, all of the antenna elements can be utilized or excited, but the unequal (significant unequal) length routing of the feeding networks (e.g., feeding network 520*b* associated with the receiver subarray 512*b*) causes unbalance loss/phase delay to antenna element excitations and adversely affect the polarization purity and beam steering control of the receiver antenna array.

In contrast, various example embodiments provide a unique configuration of the receiver antenna array having a uniform checkered pattern that advantageously achieves equal length routing of the feeding networks from receiver core chips to antenna elements, without resulting in unutilized receiver antenna elements in the receiver antenna array. In this regard, FIG. 6 depicts a schematic drawing illustrating an arrangement or a configuration of a receiver antenna array 604, along with an arrangement or a configuration of the receiver core chips and the receiver feeding networks to the sequential rotated receiver antenna elements, according to various example embodiments of the present invention.

Figure 6:
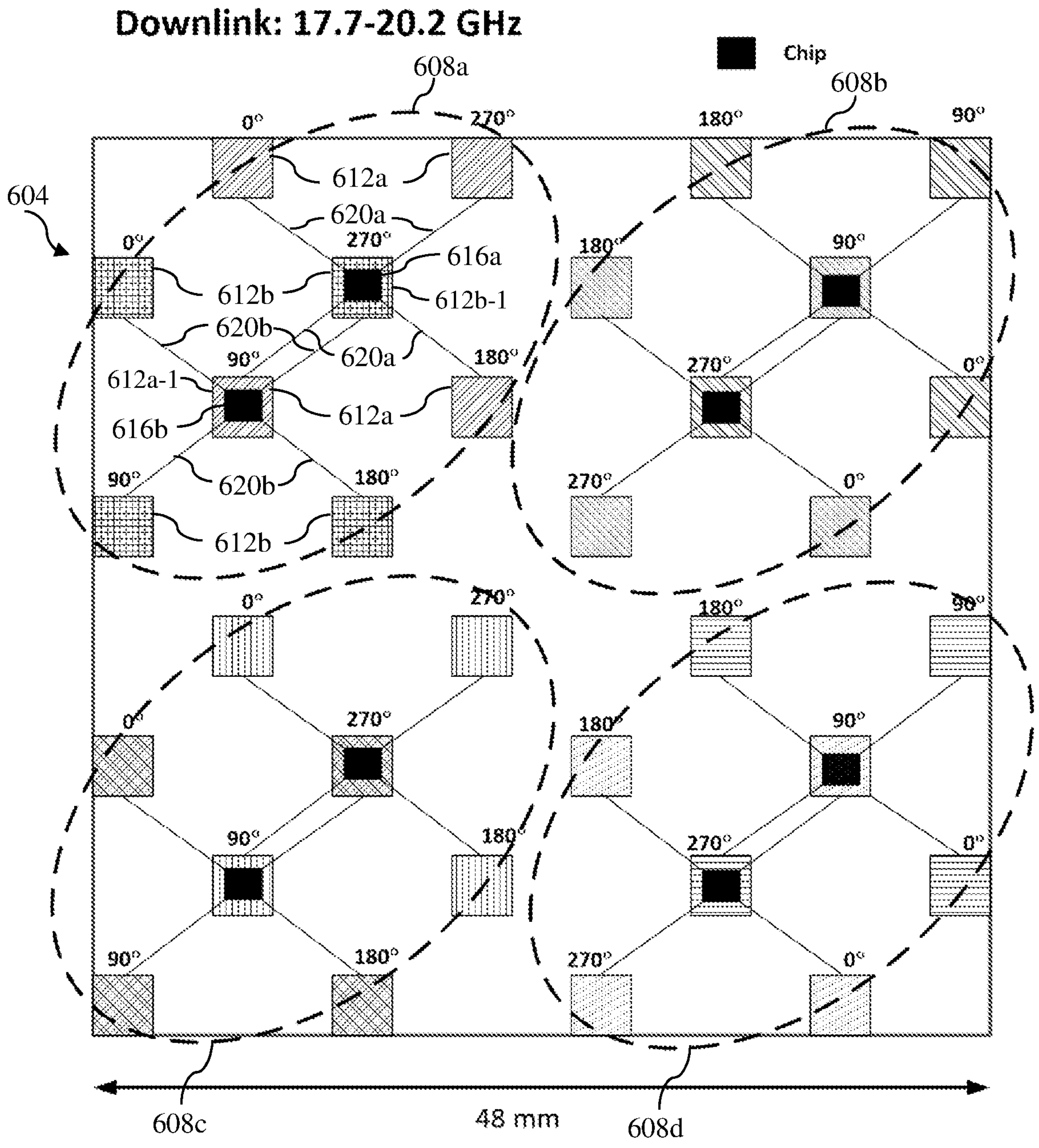
FIG. 6 depicts a schematic drawing illustrating a configuration of a receiver antenna array of the phased array antenna, along with a configuration of receiver core chips and receiver feeding networks to receiver antenna elements, according to various example embodiments of the present invention.

As shown in FIG. 6, the receiver antenna array 604 comprises one or more groups 608*a*-608*d* of receiver antenna elements, each group of receiver antenna elements comprising a first receiver subarray (e.g., 612*a* for the group 608*a*) of receiver antenna elements and a second receiver subarray (e.g., 612*b* for the group 608*a*) of receiver antenna elements; a plurality of receiver core chips, comprising, for each of the one or more groups 608*a*-608*d* of receiver antenna elements, a first receiver core chip (e.g., 616*a* for the group 608*a*) associated with the first receiver subarray (e.g., 612*a*) of the group (e.g., 608*a*) of receiver radiating elements and a second receiver core chip (e.g., 616*b* for the group 608*a*) associated with the second receiver subarray (e.g., 612*b*) of the group (e.g., 608*a*) of receiver antenna elements; and a plurality of receiver feeding networks, comprising, for each of the one or more groups 608*a*-608*d* of receiver antenna elements, a first receiver feeding network (e.g., 620*a* for the group 608*a*) comprising a plurality of first feed lines communicatively coupling (and extending from) the first receiver core chip (e.g., 616*a*) to receiver antenna elements of the first receiver subarray (e.g., 612*a*), respectively, of the group (e.g., 608*a*) of receiver antenna elements, and a second receiver feeding network (e.g., 620*b* for the group 608*a*) comprising a plurality of second feed lines communicatively coupling (and extending from) the second receiver core chip (e.g. 616*b*) to receiver antenna elements of the second receiver subarray (e.g., 612*b*), respectively, of the group (e.g., 608*a*) of receiver antenna elements.

In addition, the one or more groups 608*a*-608*d* of receiver antenna elements are arranged to collectively have a uniform diagonal square lattice configuration of receiver antenna elements. In particular, for each of the one or more groups 608*a*-608*d* of receiver antenna elements, a first receiver antenna element (e.g., 612*a*-1) of the first receiver subarray (e.g., 612*a*) of the group (e.g., 608*a*) of receiver antenna elements and the second receiver core chip (e.g., 616*b*) associated with the second receiver subarray (612*b*) of the group (608*a*) of receiver antenna elements are arranged at or along a center of the second receiver subarray (e.g., 612*b*) and a first receiver antenna element (e.g., 612*b*-1) of the second receiver subarray (e.g., 612*b*) of the group (e.g., 608*a*) of receiver antenna elements and the first receiver core chip (e.g., 616*a*) associated with the first receiver subarray (e.g., 612*a*) of the group (e.g., 608*a*) of receiver antenna elements are arranged at or along a center of the first receiver subarray (e.g., 612*a*) such that the plurality of first feed lines (e.g., 620*a*) and the plurality of second feed lines (e.g., 620*b*) associated with the group (e.g., 608*a*) of receiver antenna elements have equal length.

It will be understood by a person skilled in the art that, for clarity and conciseness, only components or elements of, or associated with, one group 608*a* of receiver radiating elements are denoted with reference numerals in FIG. 6. In this regard, it will be understood by a persons skilled in the art that components or elements of, or associated with, the group 608*a* of receiver radiating elements described herein according to various example embodiments also apply (in the same or similar manner) to the same or corresponding components or elements of, or associated with, any other group (e.g., 608*b* to 608*d*) of receiver radiating elements of the receiver antenna array 604, which are simply not repeated with respect to such other group (e.g., 608*b* to 608*d*) of receiver radiating elements for clarity and conciseness.

By way of an example only and without limitation, the receiver antenna array 604 may comprise 32 receiver antenna elements arranged to collectively have a uniform diagonal square lattice configuration as illustrated in FIG. 6. For example, the 32 receiver antenna elements may be grouped into, or considered as having, four groups 608*a*-608*d* of receiver antenna elements, each group comprising 8 receiver antenna elements (e.g., 612*a*, 612*b* for group 608*a*). In particular, each group (e.g., 608*a*) comprises a first receiver subarray (e.g., 612*a*) of four receiver antenna elements and a second receiver subarray (e.g., 612*b*) of four receiver antenna elements. For each of the groups of receiver antenna elements, the first receiver subarray (e.g., 612*a*) of the group (e.g., 608*a*) has a first receiver feeding network (e.g., 620*a*) associated therewith configured to communicatively couple the associated receiver core chip (e.g., 616*a*) thereto, and the second receiver subarray (e.g., 612*b*) of the group (e.g., 608*a*) has a second receiver feeding network (e.g., 620*b*) associated therewith configured to communicatively couple the associated receiver core chip (e.g., 616*b*) thereto.

As shown in FIG. 6, for each group of receiver antenna elements, the first receiver subarray (e.g., 612*a*) and the second receiver subarray (e.g., 612*b*) of the group (e.g., 608*a*) partially overlap (with partially shared area) such that at the center of one receiver subarray (e.g., 612*a*), it is located a first receiver antenna element (e.g., 612*b*-1) of the other receiver subarray (e.g., 612*b*). Furthermore, the first receiver core chip (e.g., 616*a*) associated with the first receiver subarray (e.g., 612*a*) is arranged along the center of the first receiver subarray (e.g., 612*a*) and under (e.g., in a layer immediately under) the above-mentioned first receiver antenna element (e.g., 612*b*-1) of the second receiver subarray (e.g., 612*b*) such that the feed lines of the first receiver feeding network (e.g., 620*a*) have equal length. Similarly, the second receiver core chip (e.g., 616*b*) associated with the second receiver subarray (e.g., 612*b*) is arranged along the center of the second receiver subarray (e.g., 612*b*) and under (e.g., in a layer immediately under) the above-mentioned first receiver antenna element (e.g., 612*a*-1) of the first receiver subarray (e.g., 612*a*) such that the feed lines of the second receiver feeding network (e.g., 620*b*) have equal length (and also equal length with the feed lines of the first receiver feeding network (e.g., 620*a*)).

Accordingly, each group of receiver antenna elements comprises two receiver subarrays of receiver antenna elements (e.g., each receiver subarray having a dimension of 2×2 sequentially rotated receiver antenna elements) that partially overlap, which may be referred to herein as two interlocked receiver subarrays of receiver antenna elements. Furthermore, as shown in FIG. 6, the receiver feeding networks are configured such that equal length routing of the feed lines from the receiver core chips to the 32 receiver antenna elements is achieved.

Figure 7:
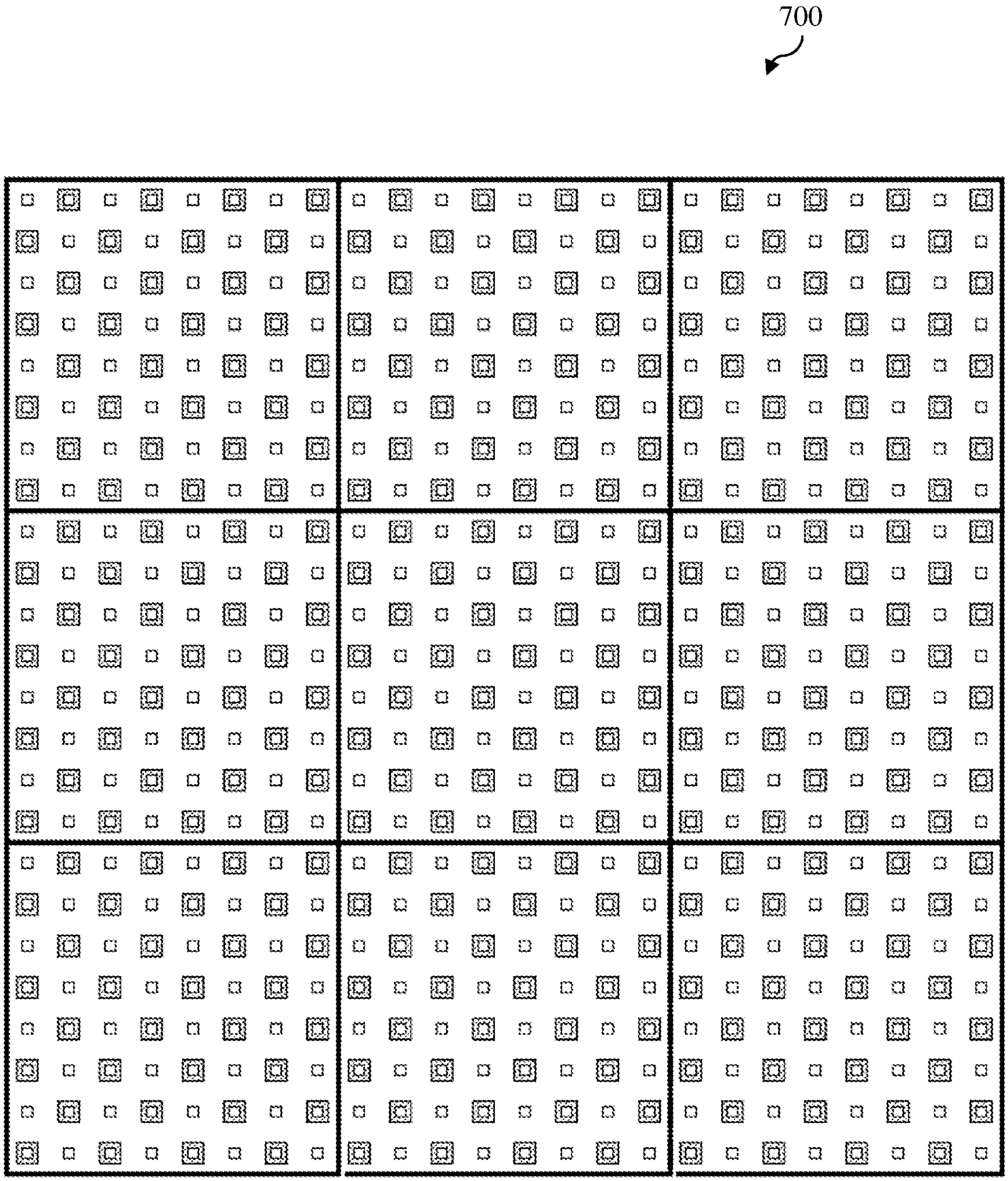
FIG. 7 depicts a schematic drawing of a dual band large antenna array formed by an array of adjoined antenna modules, according to various example embodiments of the present invention.

Accordingly, the phased array antenna 300 according to various example embodiments of the present invention advantageously achieves equal length routing to all transmitter and receiver antenna elements respectively and excite the antenna elements (without unutilized antenna elements) with identical amplitude and 90° phase difference accordingly. Furthermore, the phased array antenna 300 according to various example embodiments of the present invention advantageously provides array modularity and scalability, whereby the phased array antenna 300 has the benefit and flexibility to scale up the antenna array size by simply adding more antenna modules as desired or as appropriate (e.g., nine antenna modules in a 3×3 array illustrated in FIG. 7), for example, to increase transmitter EIRP (Effective Isotropic Radiated Power) and receiver G/T (receiver antenna gain to system noise temperature) based on system requirements. In the resultant larger antenna array with multiple adjoined antenna modules, the design requirement of around half wavelength spacing between adjacent antenna elements is still advantageously maintained for both the transmitter antenna array at 30 GHz band and the receiver antenna array at 20 GHz band. In particular, FIG. 7 depicts a schematic drawing of a dual band large antenna array 700 formed by an array of adjoined antenna modules by combining or adjoining (side by side), for example, nine antenna modules in a 3×3 array.

Figure 8A:
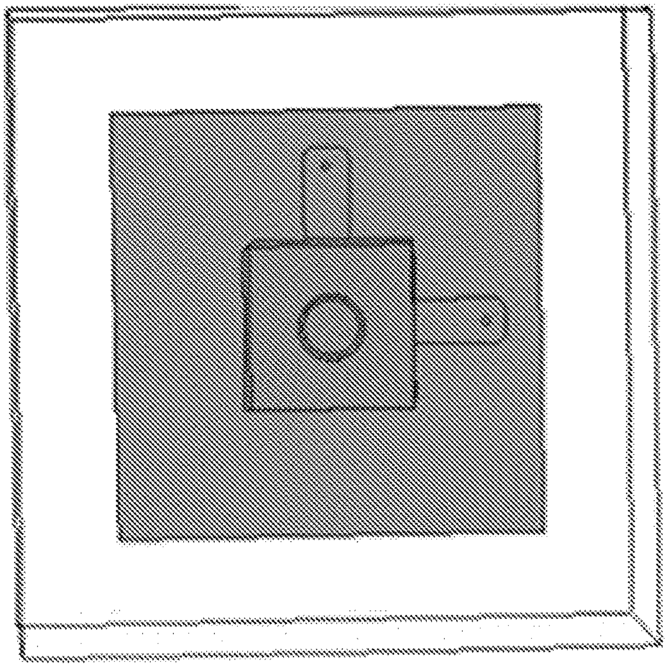
FIG. 8A depicts a schematic drawing of an example patch antenna element of an example 8-element circularly polarized (CP) patch antenna array used in simulations performed, according to various example embodiments of the present invention.
Figure 8B:
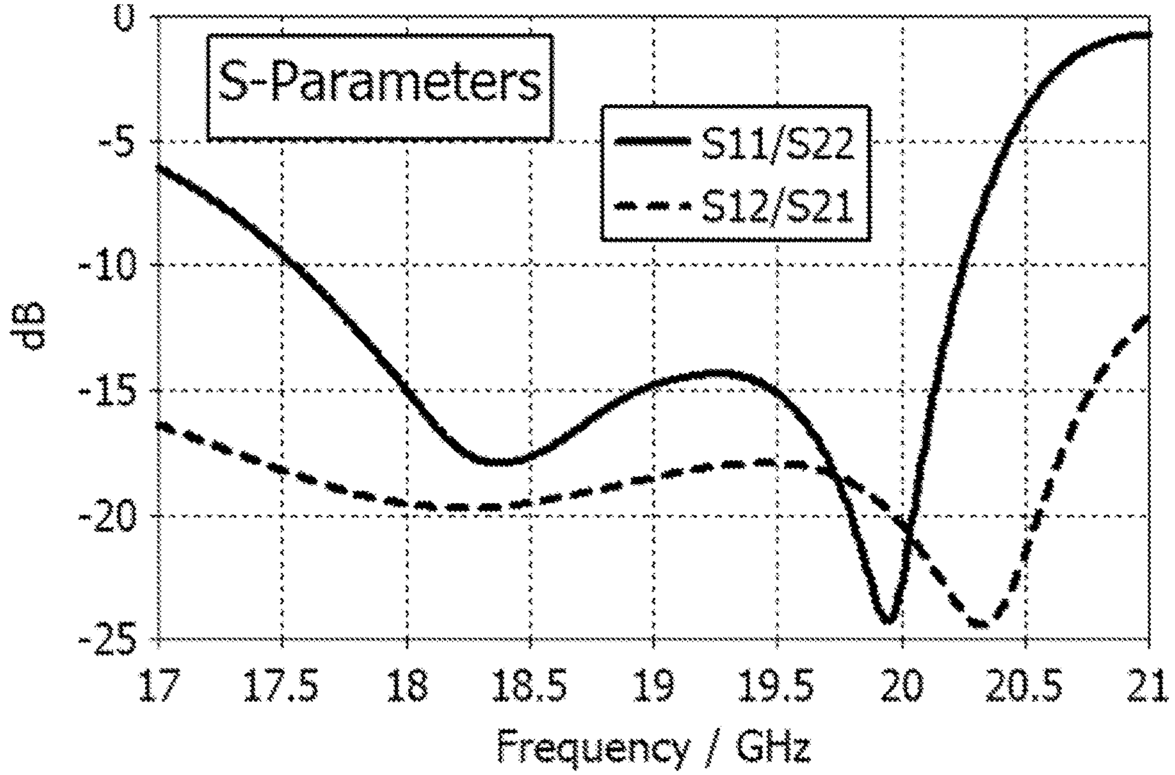
FIGS. 8B to 8D depict plots showing various simulated performances of the example 8-element CP patch antenna array, according to various example embodiments of the present invention.
Figure 8C:
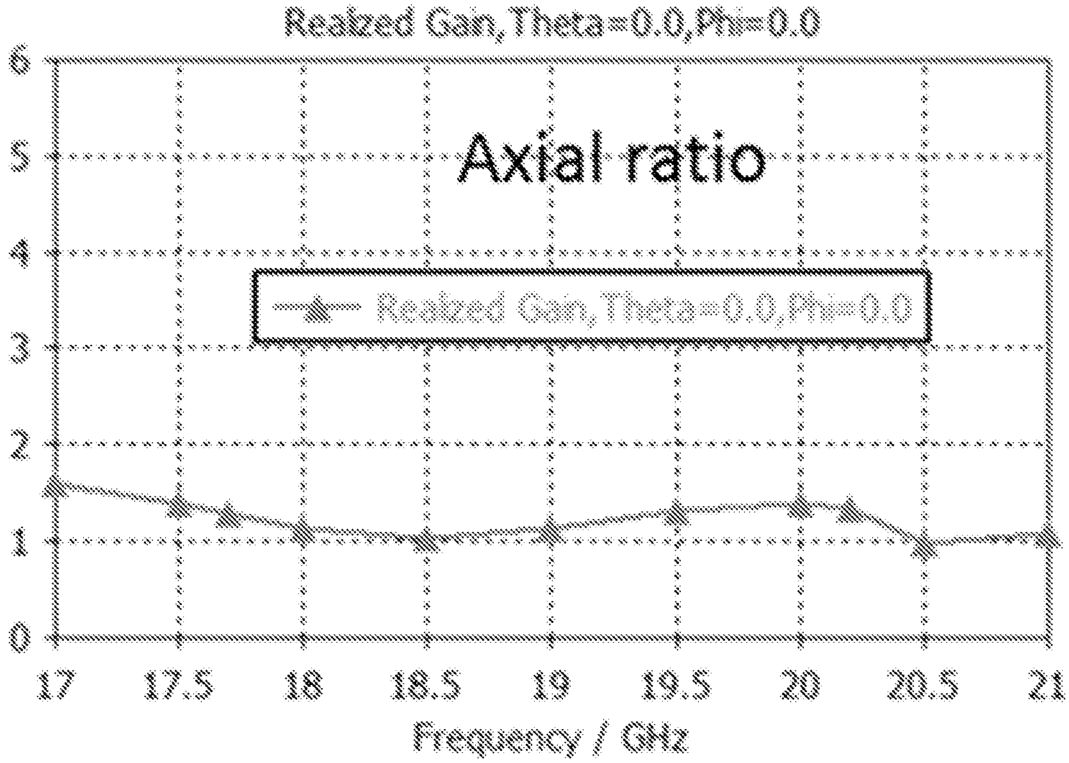
Figure 8D:
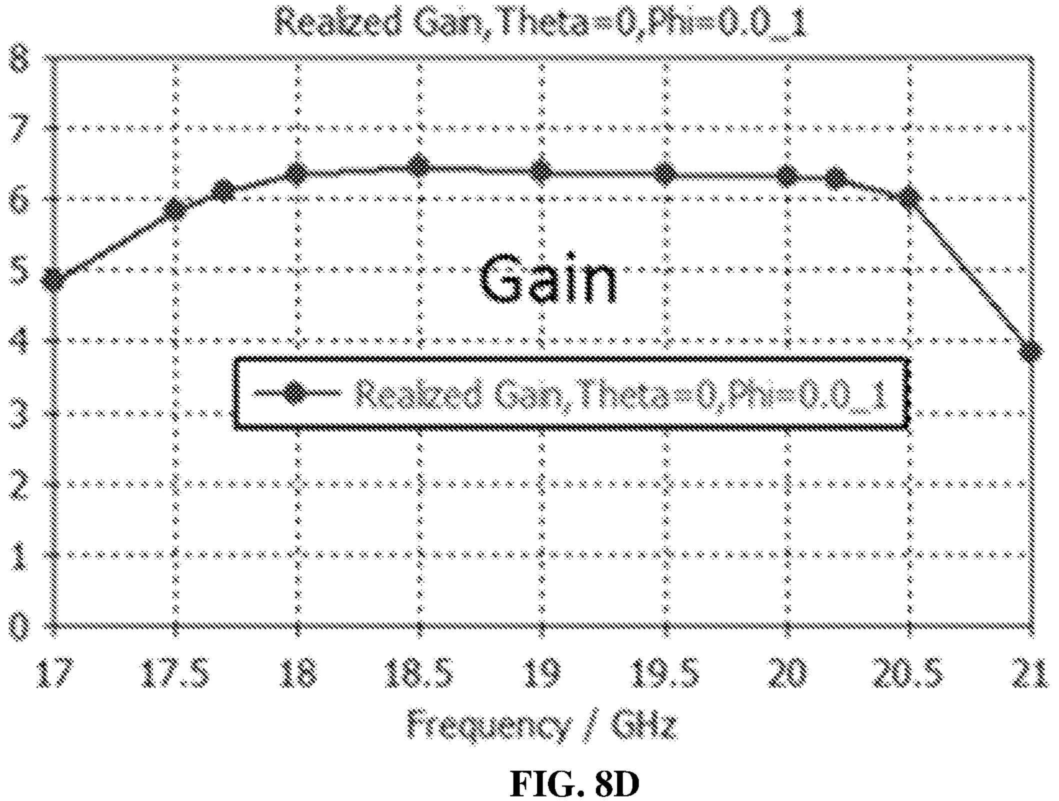
Figure 9A:
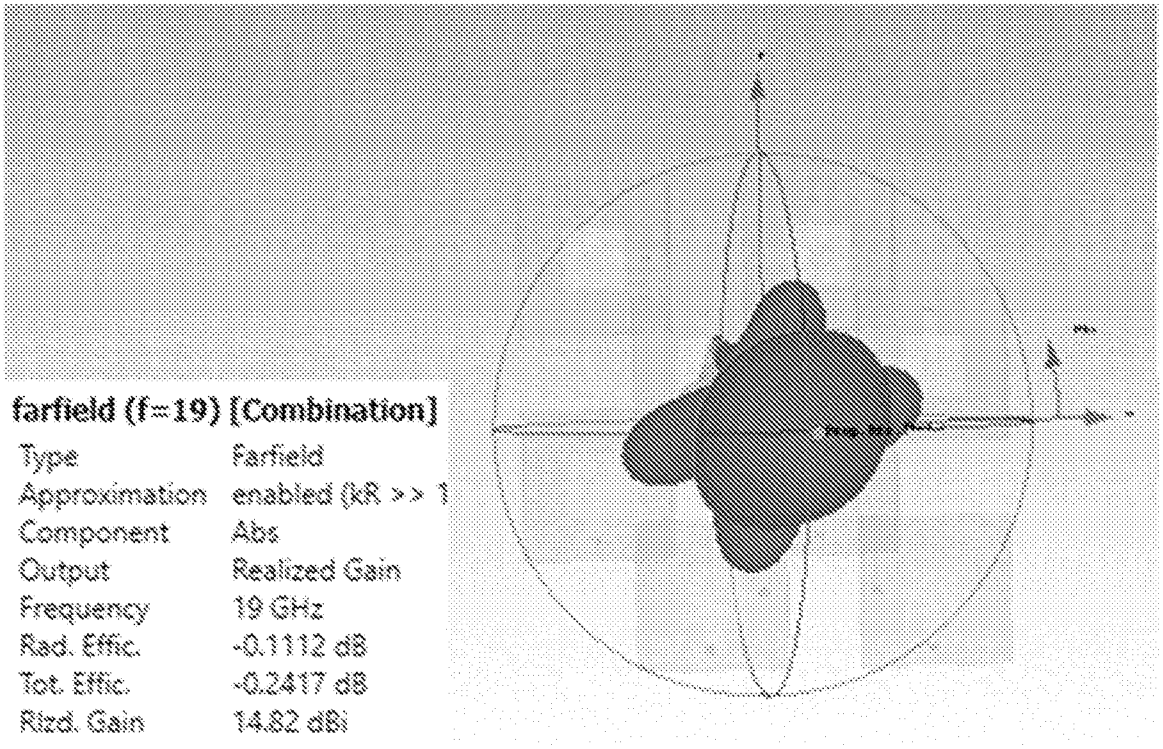
FIGS. 9A to 9E show simulated performance of the example 8-antenna CP patch elements array by showing the far field 3D and 2D antenna radiation patterns at 19 GHz, according to various example embodiments of the present invention.
Figure 9B:
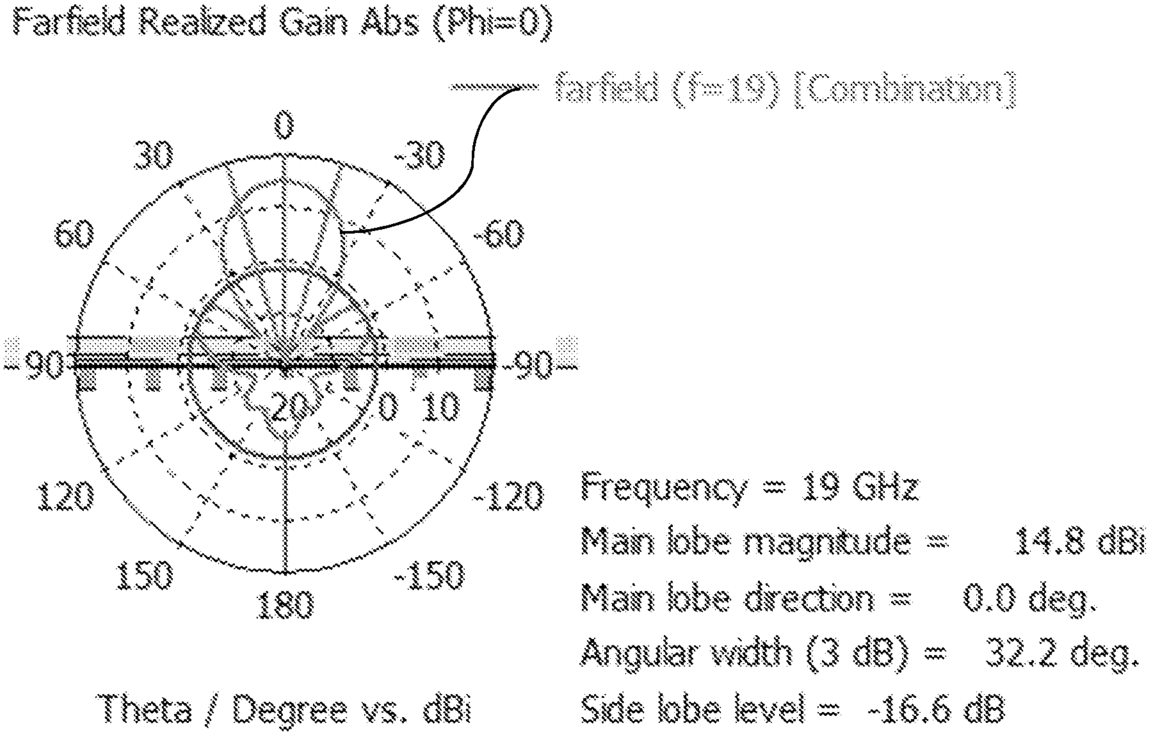
Figure 9C:
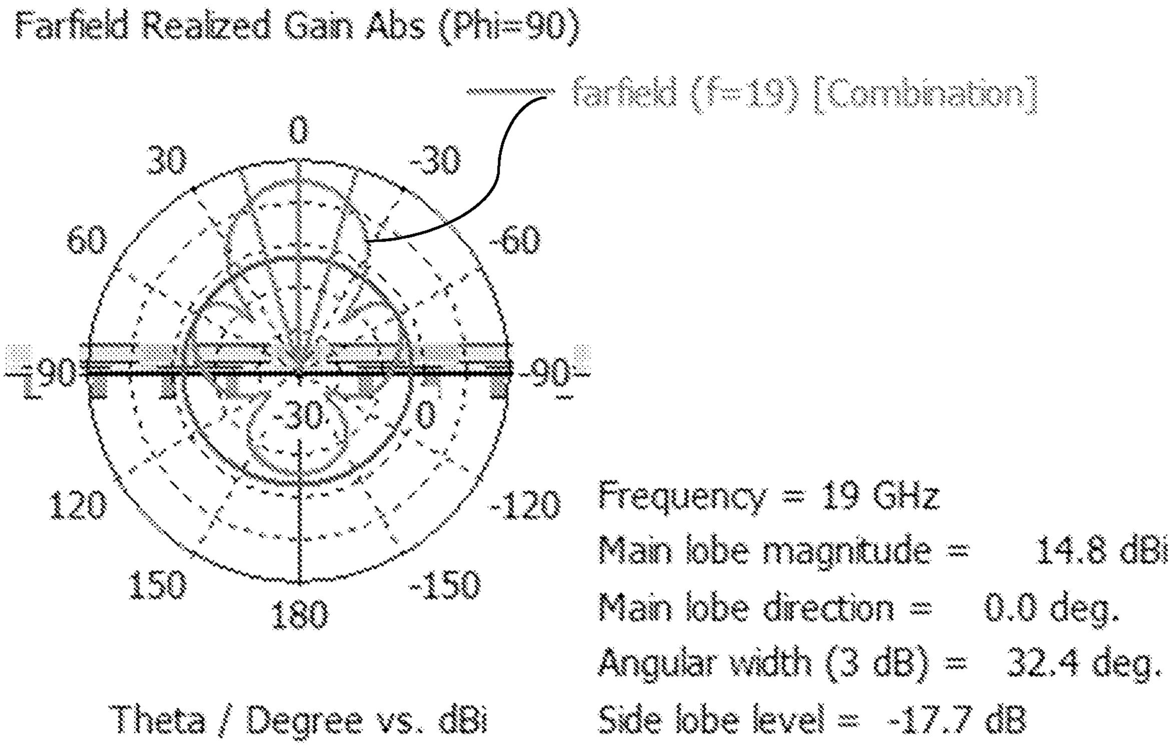
Figure 9D:
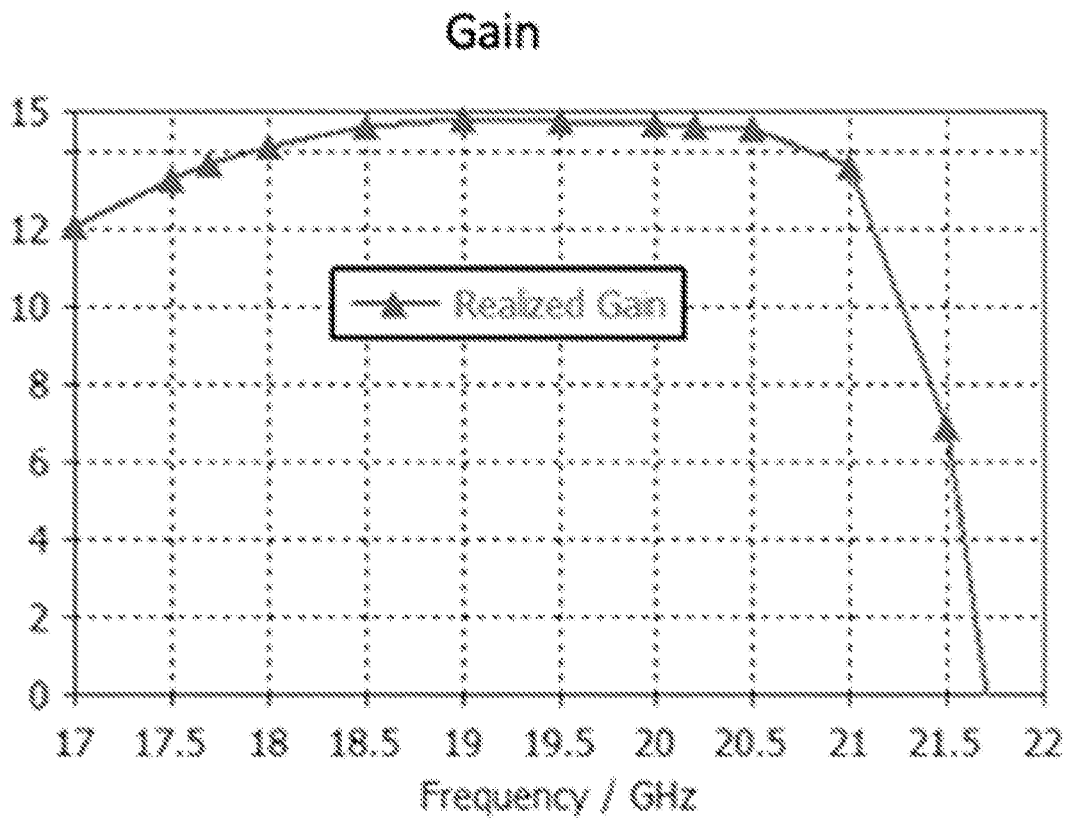
Figure 9E:
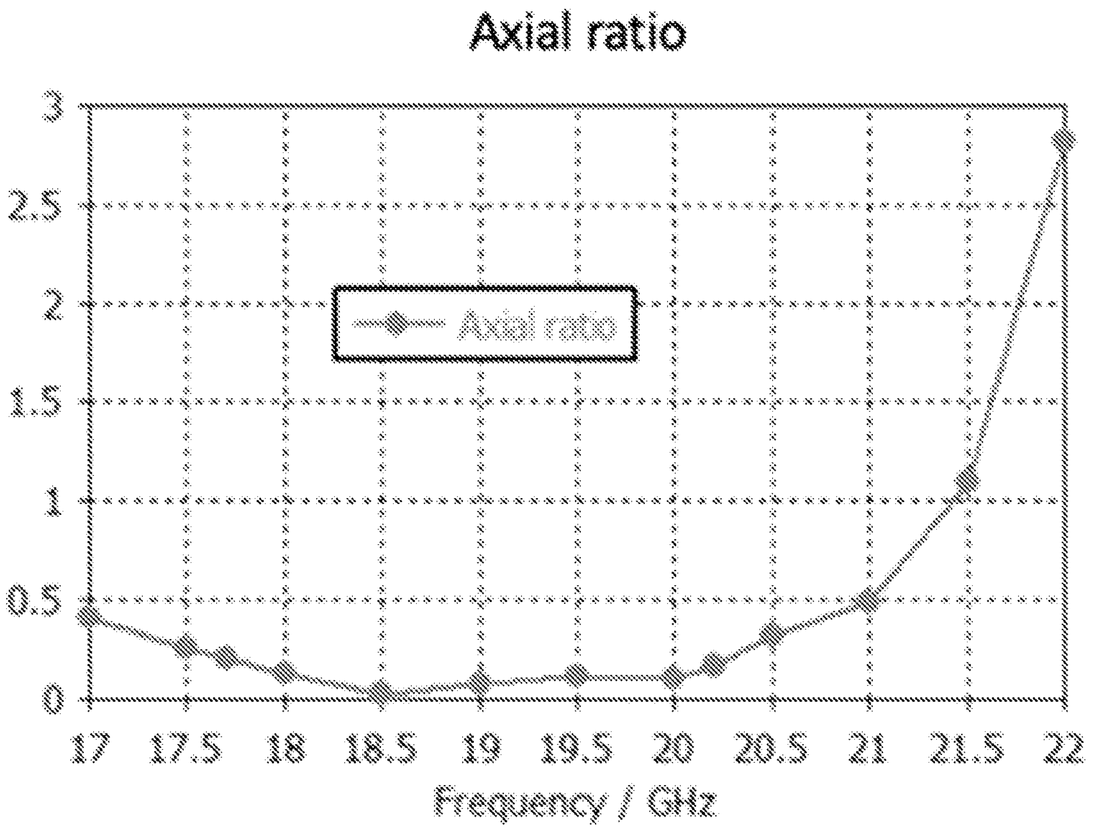

To demonstrate the performance of the architecture or configuration of the receiver antenna array according to various example embodiments of the present invention, an example 8-element CP patch antenna array operating at 20 GHz was designed. According to the configuration as described hereinbefore with reference to FIG. 6, the eight receiver antenna elements are positioned on a uniform checkered pattern and configured as two interlocked and sequentially rotated 2×2 receiver subarrays. FIG. 8A depicts a schematic drawing of an example patch antenna element and FIGS. 8B to 8D shows the simulated performances of the example 8-element CP patch antenna array. FIG. 8B shows that the impedance matching is good with return loss larger than 15 dB from 17.7 GHZ to 20.2 GHZ, and FIGS. 8C and 8D shows gain of the greater than 6 dBic, and the axial ratio being less than 1.5, indicating a high circular polarization purity of the example 8-element CP patch antenna array.

FIGS. 9A to 9E shows the simulated performance of the example 8-antenna CP patch elements array by showing the far field 3D and 2D antenna radiation patterns at 19 GHz. They show that the main beam of the antenna array is correctly formed with the array boresight gain of 14.8 dBic and the side lobe level of below −16.6 dB. With balanced equal length feeding network routing and sequential rotation subarrays, it can be observed that the array architecture according to various example embodiments of the present invention achieves a very high circular polarization purity with an axial ratio close to the ideal value of 1

Accordingly, various example embodiments advantageously provide a sequentially rotated circularly polarized receiver antenna array having a uniform checkered pattern antenna element configuration that is configured to achieve equal length routing for the feeding networks from receiver core chips to receiver antenna elements.

In various example embodiments, the receiver antenna array may be implemented on a chip or circuit board (e.g., a multilayer substrate constituting a single antenna board). In an example as described hereinbefore with reference to FIG. 6, the receiver antenna array 604 comprises: 32 receiver antenna elements divided into four groups 608*a*-608*d*, each group comprising eight receiver antenna elements; and feeding networks to the eight receiver antenna elements are configured in such a way that the eight receiver antenna elements can be configured as two receiver subarrays 612$a$, 612$b$ (sequentially rotated 2×2 receiver subarrays) with partially shared area to form two interlocked 2×2 receiver subarrays 612$a$, 612$b$. In addition, a receiver antenna element (e.g., 612$b$-1) of one receiver subarray (e.g., 612$b$) is located at the center of the other receiver subarray (e.g., 612$a$), and a receiver core chip (e.g., 616$a$) (e.g., a phase shifter front end chip) for the one receiver subarray (e.g., 612$a$) is placed along the center of the receiver subarray (e.g., 612$a$) and behind the receiver antenna element (e.g., 612$b$-1) of the other receiver subarray (e.g., 612$b$), thereby forming equal length routing of the feed lines from the core chips to the 32 receiver antenna elements of the receiver antenna array 604. Furthermore, the receiver antenna elements of each antenna subarray are circularly polarised.

In various embodiments, as described hereinbefore, the phased array antenna according to various example embodiments advantageously achieves equal length routing to all transmitter and receiver antenna elements respectively and excite the antenna elements with identical amplitude and 90 degrees phase difference accordingly.

In various embodiments, as described hereinbefore, the phased array antenna 300 according to various example embodiments advantageously provides array modularity and scalability, whereby the phased array antenna 300 has the benefit and flexibility to scale up the antenna array size by simply adding more antenna modules as desired or as appropriate to form a larger antenna array.

Figure 10:
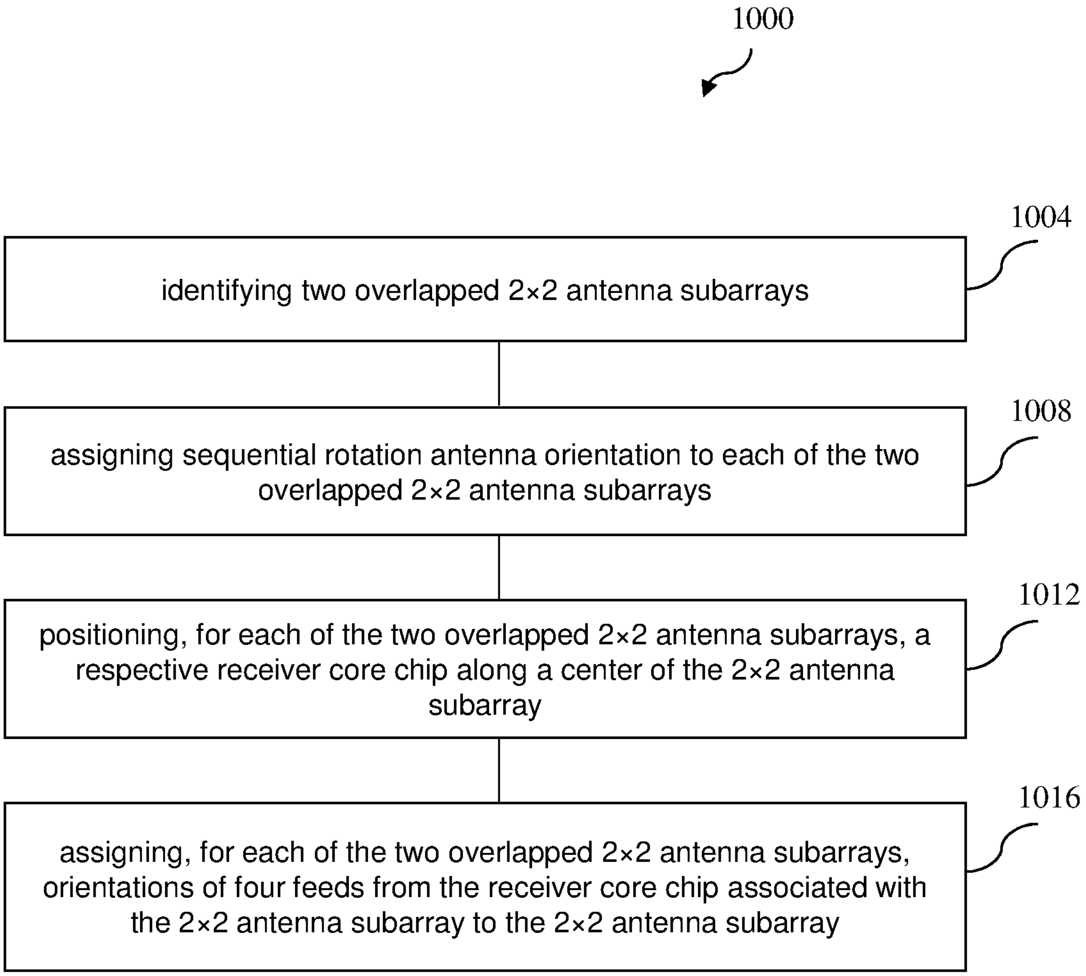
FIG. 10 depicts a schematic flow diagram of a method of configuring or designing a receiver antenna array, according to various example embodiments

FIG. 10 depicts a schematic flow diagram of a method 1000 of configuring or designing a receiver antenna array according to various example embodiments. The method comprises: identifying (at 1004) two overlapped 2×2 receiver subarrays (e.g., as described hereinbefore with reference to FIG. 6); assigning (at 1008) sequential rotation antenna orientation to each of the two overlapped 2×2 antenna subarrays; positioning (at 1012), for each of the two overlapped 2×2 antenna subarrays, a respective receiver core chip (e.g., phase shifter front end chip) along a center of the 2×2 antenna subarray; assigning (at 1016), for each of the two overlapped 2×2 antenna subarrays, orientations of four feeds from the receiver core chip associated with the 2×2 antenna subarray to the receiver antenna elements of the 2×2 antenna subarray, whereby the orientations are in sequential rotation manner. Accordingly, a partially-shared aperture sequential rotation for a receiver antenna array may be provided according to various example embodiments of the present invention.

Accordingly, the phased array antenna according to various example embodiments of the present invention advantageously offers minimal routing loss, provides array modularity and scalability, routing symmetry and routing simplicity.

While embodiments of the present invention have been particularly shown and described with reference to specific embodiments, it should be understood by those skilled in the art that various changes in form and detail may be made therein without departing from the scope of the present invention as defined by the appended claims. The scope of the present invention is thus indicated by the appended claims and all changes which come within the meaning and range of equivalency of the claims are therefore intended to be embraced.

What is claimed is:

1. A phased array antenna, comprising:

a receiver antenna array comprising one or more groups of receiver radiating elements, each group of receiver radiating elements comprising a first receiver subarray of receiver radiating elements and a second receiver subarray of receiver radiating elements;

a plurality of receiver core chips, comprising, for each of the one or more groups of receiver radiating elements, a first receiver core chip associated with the first receiver subarray of the group of receiver radiating elements and a second receiver core chip associated with the second receiver subarray of the group of receiver radiating elements; and a plurality of receiver feeding networks, comprising, for each of the one or more groups of receiver radiating elements, a first receiver feeding network comprising a plurality of first feed lines communicatively coupling the first receiver core chip to receiver radiating elements of the first receiver subarray, respectively, of the group of receiver radiating elements, and a second receiver feeding network comprising a plurality of second feed lines communicatively coupling the second receiver core chip to receiver radiating elements of the second receiver subarray, respectively, of the group of receiver radiating elements, wherein the one or more groups of receiver radiating elements are arranged to collectively have at least substantially a uniform diagonal square lattice configuration of receiver radiating elements, and for each of the one or more groups of receiver radiating elements, a first receiver radiating element of the first receiver subarray of the group of receiver radiating elements and the second receiver core chip associated with the second receiver subarray of the group of receiver radiating elements are arranged at least substantially at or along a center of the second receiver subarray and a first receiver radiating element of the second receiver subarray of the group of receiver radiating elements and the first receiver core chip associated with the first receiver subarray of the group of receiver radiating elements are arranged at least substantially at or along a center of the first receiver subarray such that the plurality of first feed lines and the plurality of second feed lines associated with the group of receiver radiating elements have at least substantially equal length.

2. The phased array antenna according to claim 1, wherein, for each of the one or more groups of receiver radiating elements, the first receiver core chip associated with the first receiver subarray of the group of receiver radiating elements is configured to excite the receiver radiating elements of the first receiver subarray via the first receiver feeding network to circularly polarize the receiver radiating elements of the first receiver subarray, and the second receiver core chip associated with the second receiver subarray of the group of receiver radiating elements is configured to excite the receiver radiating elements of the second receiver subarray via the second receiver feeding network to circularly polarize the receiver radiating elements of the second receiver subarray.

3. The phased array antenna according to claim 2, wherein, for each of the one or more groups of receiver radiating elements, the first receiver subarray and the second receiver subarray of the group of receiver radiating elements each has a dimension of 2×2, the first receiver core chip associated with the first receiver subarray of the group of receiver radiating elements is configured to excite the receiver radiating elements of the first receiver subarray with identical amplitude and 90° phase difference, and the second receiver core chip associated with the second receiver subarray of the group of receiver radiating elements is configured to excite the receiver radiating elements of the second receiver subarray with identical amplitude and 90° phase difference.

4. The phased array antenna according to claim 1, wherein in the uniform diagonal square lattice configuration of receiver radiating elements, immediately diagonally adjacent receiver radiating elements are located a distance of about $0.5\lambda_{Rx}$ apart, whereby $\lambda_{Rx}$ denotes the free space wavelength at 20 GHz.

5. The phased array antenna according to claim 1, further comprising:

a transmitter antenna array comprising a plurality of transmitter subarrays of transmitter radiating elements;

a plurality of transmitter core chips, comprising, for each of the plurality of transmitter subarrays, a transmitter core chip associated with the transmitter subarray; and a plurality of transmitter feeding networks, comprising, for each of the plurality of transmitter subarrays, a transmitter feeding network comprising a plurality of feed lines communicatively coupling the transmitter core chip to transmitter radiating elements of the transmitter subarray, respectively, wherein the plurality of transmitter subarrays are arranged to collectively have at least substantially a uniform square lattice configuration of transmitter radiating elements, and for each of the plurality of transmitter subarrays, the transmitter core chip associated with the transmitter subarray is arranged at least substantially along a center of the transmitter subarray such that the plurality of feed lines associated with the transmitter subarray have at least substantially equal length.

6. The phased array antenna according to claim 5, wherein, for each of the plurality of transmitter subarrays, the transmitter core chip associated with the transmitter subarray is configured to excite the transmitter radiating elements of the transmitter subarray via the transmitter feeding network to circularly polarize the transmitter radiating elements of the transmitter subarray.

7. The phased array antenna according to claim 6, wherein, for each of the plurality of transmitter subarrays, the transmitter subarray has a dimension of 2×2, and the transmitter core chip associated with the transmitter subarray is configured to excite the transmitter radiating elements of the transmitter subarray with identical amplitude and 90° phase difference.

8. The phased array antenna according to claim 5, wherein in the uniform square lattice configuration of transmitter radiating elements, immediately adjacent transmitter radiating elements are located a distance of about $0.5\lambda_{Tx}$ apart, whereby $\lambda_{Tx}$ denotes the free space wavelength at 30 GHz.

9. The phased array antenna according to claim 5, wherein the receiver antenna array and the transmitter antenna array are formed in different layers of a multilayer substrate, and a plurality of receiver radiating elements of the receiver antenna array are respectively co-located along an axis with a plurality of transmitter radiating elements of the transmitter antenna array to have a multilayer shared aperture configuration.

10. The phased array antenna according to claim 1, comprising an array of adjoined antenna modules, comprising:

a first antenna module comprising:

the receiver antenna array;

the plurality of receiver core chips; and the plurality of receiver feeding networks; and one or more additional antenna modules, each additional antenna module comprising:

a receiver antenna array comprising one or more groups of receiver radiating elements, each group of receiver radiating elements comprising a first receiver subarray of receiver radiating elements and a second receiver subarray of receiver radiating elements;

a plurality of receiver core chips, comprising, for each of the one or more groups of receiver radiating elements, a first receiver core chip associated with the first receiver subarray of the group of receiver radiating elements and a second receiver core chip associated with the second receiver subarray of the group of receiver radiating elements; and a plurality of receiver feeding networks, comprising, for each of the one or more groups of receiver radiating elements, a first receiver feeding network comprising a plurality of first feed lines communicatively coupling the first receiver core chip to receiver radiating elements of the first receiver subarray, respectively, of the group of receiver radiating elements, and a second receiver feeding network comprising a plurality of second feed lines communicatively coupling the second receiver core chip to receiver radiating elements of the second receiver subarray, respectively, of the group of receiver radiating elements, wherein the one or more groups of receiver radiating elements are arranged to collectively have at least substantially a uniform diagonal square lattice configuration of receiver radiating elements, and for each of the one or more groups of receiver radiating elements, a first receiver radiating element of the first receiver subarray of the group of receiver radiating elements and the second receiver core chip associated with the second receiver subarray of the group of receiver radiating elements are arranged at least substantially at or along a center of the second receiver subarray and a first receiver radiating element of the second receiver subarray of the group of receiver radiating elements and the first receiver core chip associated with the first receiver subarray of the group of receiver radiating elements are arranged at least substantially at or along a center of the first receiver subarray such that the plurality of first feed lines and the plurality of second feed lines associated with the group of receiver radiating elements have at least substantially equal length.

11. A method of manufacturing a phased array antenna, the method comprising:

forming a receiver antenna array comprising one or more groups of receiver radiating elements, each group of receiver radiating elements comprising a first receiver subarray of receiver radiating elements and a second receiver subarray of receiver radiating elements;

providing a plurality of receiver core chips, comprising, for each of the one or more groups of receiver radiating elements, a first receiver core chip associated with the first receiver subarray of the group of receiver radiating elements and a second receiver core chip associated with the second receiver subarray of the group of receiver radiating elements; and forming a plurality of receiver feeding networks, comprising, for each of the one or more groups of receiver radiating elements, a first receiver feeding network comprising a plurality of first feed lines communicatively coupling the first receiver core chip to receiver radiating elements of the first receiver subarray, respectively, of the group of receiver radiating elements, and a second receiver feeding network comprising a plurality of second feed lines communicatively coupling the second receiver core chip to receiver radiating elements of the second receiver subarray, respectively, of the group of receiver radiating elements, wherein the one or more groups of receiver radiating elements are arranged to collectively have at least substantially a uniform diagonal square lattice configuration of receiver radiating elements, and for each of the one or more groups of receiver radiating elements, a first receiver radiating element of the first receiver subarray of the group of receiver radiating elements and the second receiver core chip associated with the second receiver subarray of the group of receiver radiating elements are arranged at least substantially at or along a center of the second receiver subarray and a first receiver radiating element of the second receiver subarray of the group of receiver radiating elements and the first receiver core chip associated with the first receiver subarray of the group of receiver radiating elements are arranged at least substantially at or along a center of the first receiver subarray such that the plurality of first feed lines and the plurality of second feed lines associated with the group of receiver radiating elements have at least substantially equal length.

12. The method according to claim 11, wherein, for each of the one or more groups of receiver radiating elements, the first receiver core chip associated with the first receiver subarray of the group of receiver radiating elements is configured to excite the receiver radiating elements of the first receiver subarray via the first receiver feeding network to circularly polarize the receiver radiating elements of the first receiver subarray, and the second receiver core chip associated with the second receiver subarray of the group of receiver radiating elements is configured to excite the receiver radiating elements of the second receiver subarray via the second receiver feeding network to circularly polarize the receiver radiating elements of the second receiver subarray.

13. The method according to claim 12, wherein, for each of the one or more groups of receiver radiating elements, the first receiver subarray and the second receiver subarray of the group of receiver radiating elements each has a dimension of 2×2, the first receiver core chip associated with the first receiver subarray of the group of receiver radiating elements is configured to excite the receiver radiating elements of the first receiver subarray with identical amplitude and 90° phase difference, and the second receiver core chip associated with the second receiver subarray of the group of receiver radiating elements is configured to excite the receiver radiating elements of the second receiver subarray with identical amplitude and 90° phase difference.

14. The method according to claim 11, wherein in the uniform diagonal square lattice configuration of receiver radiating elements, immediately diagonally adjacent receiver radiating elements are located a distance of about $0.5\lambda_{Rx}$ apart, whereby $\lambda_{Rx}$ denotes the free space wavelength at 20 GHz.

15. The method according to claim 11, further comprising:

forming a transmitter antenna array comprising a plurality of transmitter subarrays of transmitter radiating elements;

providing a plurality of transmitter core chips, comprising, for each of the plurality of transmitter subarrays, a transmitter core chip associated with the transmitter subarray; and forming a plurality of transmitter feeding networks, comprising, for each of the plurality of transmitter subarrays, a transmitter feeding network comprising a plurality of feed lines communicatively coupling the transmitter core chip to transmitter radiating elements of the transmitter subarray, respectively, wherein the plurality of transmitter subarrays are arranged to collectively have at least substantially a uniform square lattice configuration of transmitter radiating elements, and for each of the plurality of transmitter subarrays, the transmitter core chip associated with the transmitter subarray is arranged at least substantially along a center of the transmitter subarray such that the plurality of feed lines associated with the transmitter subarray have at least substantially equal length.

16. The method according to claim 15, wherein, for each of the plurality of transmitter subarrays, the transmitter core chip associated with the transmitter subarray is configured to excite the transmitter radiating elements of the transmitter subarray via the transmitter feeding network to circularly polarize the transmitter radiating elements of the transmitter subarray.

17. The method according to claim 16, wherein, for each of the plurality of transmitter subarrays, the transmitter subarray has a dimension of 2×2, and the transmitter core chip associated with the transmitter subarray is configured to excite the transmitter radiating elements of the transmitter subarray with identical amplitude and 90° phase difference.

18. The method according to claim 15, wherein in the uniform square lattice configuration of transmitter radiating elements, immediately adjacent transmitter radiating elements are located a distance of about $0.5\lambda_{Tx}$ apart, whereby $\lambda_{Tx}$ denotes the free space wavelength at 30 GHz.

19. The method according to claim 15, wherein the receiver antenna array and the transmitter antenna array are formed in different layers of a multilayer substrate, and a plurality of receiver radiating elements of the receiver antenna array are respectively co-located along an axis with a plurality of transmitter radiating elements of the transmitter antenna array to have a multilayer shared aperture configuration.

20. The method according to claim 11, comprising forming an array of adjoined antenna modules, comprising:

forming a first antenna module comprising:

said forming the receiver antenna array;

said providing the plurality of receiver core chips; and said forming the plurality of receiver feeding networks; and forming one or more additional antenna modules, wherein forming each additional antenna module comprises:

forming a receiver antenna array comprising one or more groups of receiver radiating elements, each group of receiver radiating elements comprising a first receiver subarray of receiver radiating elements and a second receiver subarray of receiver radiating elements;

providing a plurality of receiver core chips, comprising, for each of the one or more groups of receiver radiating elements, a first receiver core chip associated with the first receiver subarray of the group of receiver radiating elements and a second receiver core chip associated with the second receiver subarray of the group of receiver radiating elements; and forming a plurality of receiver feeding networks, comprising, for each of the one or more groups of receiver radiating elements, a first receiver feeding network comprising a plurality of first feed lines communicatively coupling the first receiver core chip to receiver radiating elements of the first receiver subarray, respectively, of the group of receiver radiating elements, and a second receiver feeding network comprising a plurality of second feed lines communicatively coupling the second receiver core chip to receiver radiating elements of the second receiver subarray, respectively, of the group of receiver radiating elements, wherein the one or more groups of receiver radiating elements are arranged to collectively have at least substantially a uniform diagonal square lattice configuration of receiver radiating elements, and for each of the one or more groups of receiver radiating elements, a first receiver radiating element of the first receiver subarray of the group of receiver radiating elements and the second receiver core chip associated with the second receiver subarray of the group of receiver radiating elements are arranged at least substantially at or along a center of the second receiver subarray and a first receiver radiating element of the second receiver subarray of the group of receiver radiating elements and the first receiver core chip associated with the first receiver subarray of the group of receiver radiating elements are arranged at least substantially at or along a center of the first receiver subarray such that the plurality of first feed lines and the plurality of second feed lines associated with the group of receiver radiating elements have at least substantially equal length.

* * * * *